United States Patent
Meiri et al.

(10) Patent No.: US 11,392,311 B2
(45) Date of Patent: Jul. 19, 2022

(54) OVERLAPPING REPLICATION CYCLES FOR ASYNCHRONOUS REPLICATION

(71) Applicant: EMC IP Holding Company LLC, Hopkinton, MA (US)

(72) Inventors: David Meiri, Somerville, MA (US); Benjamin Yoder, Chandler, AZ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 91 days.

(21) Appl. No.: 17/085,225

(22) Filed: Oct. 30, 2020

(65) Prior Publication Data

US 2022/0137820 A1    May 5, 2022

(51) Int. Cl.
*G06F 3/06* (2006.01)

(52) U.S. Cl.
CPC ............ *G06F 3/065* (2013.01); *G06F 3/0604* (2013.01); *G06F 3/0634* (2013.01); *G06F 3/0659* (2013.01); *G06F 3/0683* (2013.01)

(58) Field of Classification Search
CPC ...... G06F 3/065; G06F 3/0604; G06F 3/0634; G06F 3/0659; G06F 3/0683
See application file for complete search history.

(56) References Cited

U.S. PATENT DOCUMENTS

| | | | |
|---|---|---|---|
| 5,544,347 A | 8/1996 | Yanai et al. | |
| 5,742,792 A | 4/1998 | Yanai et al. | |
| 7,054,883 B2 * | 5/2006 | Meiri | G06F 3/0689 714/E11.107 |
| 8,732,124 B1 * | 5/2014 | Arnon | G06F 11/2076 707/613 |
| 2006/0069887 A1 * | 3/2006 | LeCrone | G06F 11/2058 711/162 |
| 2008/0162844 A1 * | 7/2008 | Yoder | H04L 69/40 711/E12.103 |

* cited by examiner

*Primary Examiner* — Eric Cardwell
(74) *Attorney, Agent, or Firm* — Muirhead and Saturnelli, LLC

(57) ABSTRACT

Peer storage systems share the workload of asynchronously replicating a shared logical storage unit (LSU) to a target system. Peer storage systems (S1 and S2) that synchronously replicate a shared LSU share the workload of asynchronously replicating the shared LSU to a target system (S3) by dividing ownership of the replication cycles in an alternating manner without a strict synchronization of cycles between the peer storage systems. Rather, a given cycle number (e.g., Cycle 1) on S1 may not start and end with a same write operation as a same cycle number (Cycle 1) on S2, such that cycles on S1 (e.g., Cycle 1 and Cycle 2) overlap with cycles having the same number (Cycle 1 and Cycle 2) on S2. S1 may asynchronously replicate to S3 only the cycles it owns, and S2 may asynchronously replicate to S3 only the cycles it owns to S3.

20 Claims, 11 Drawing Sheets

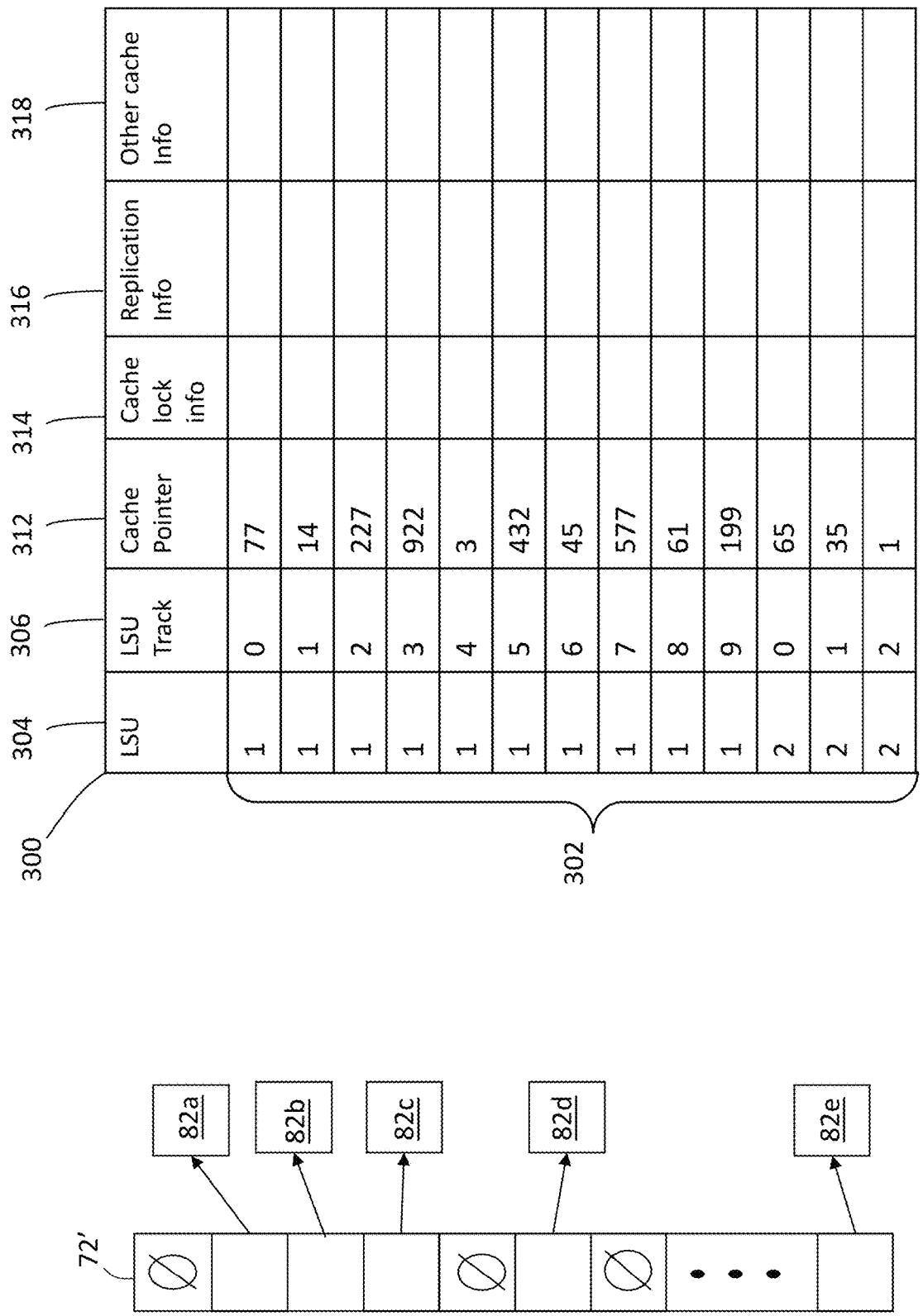

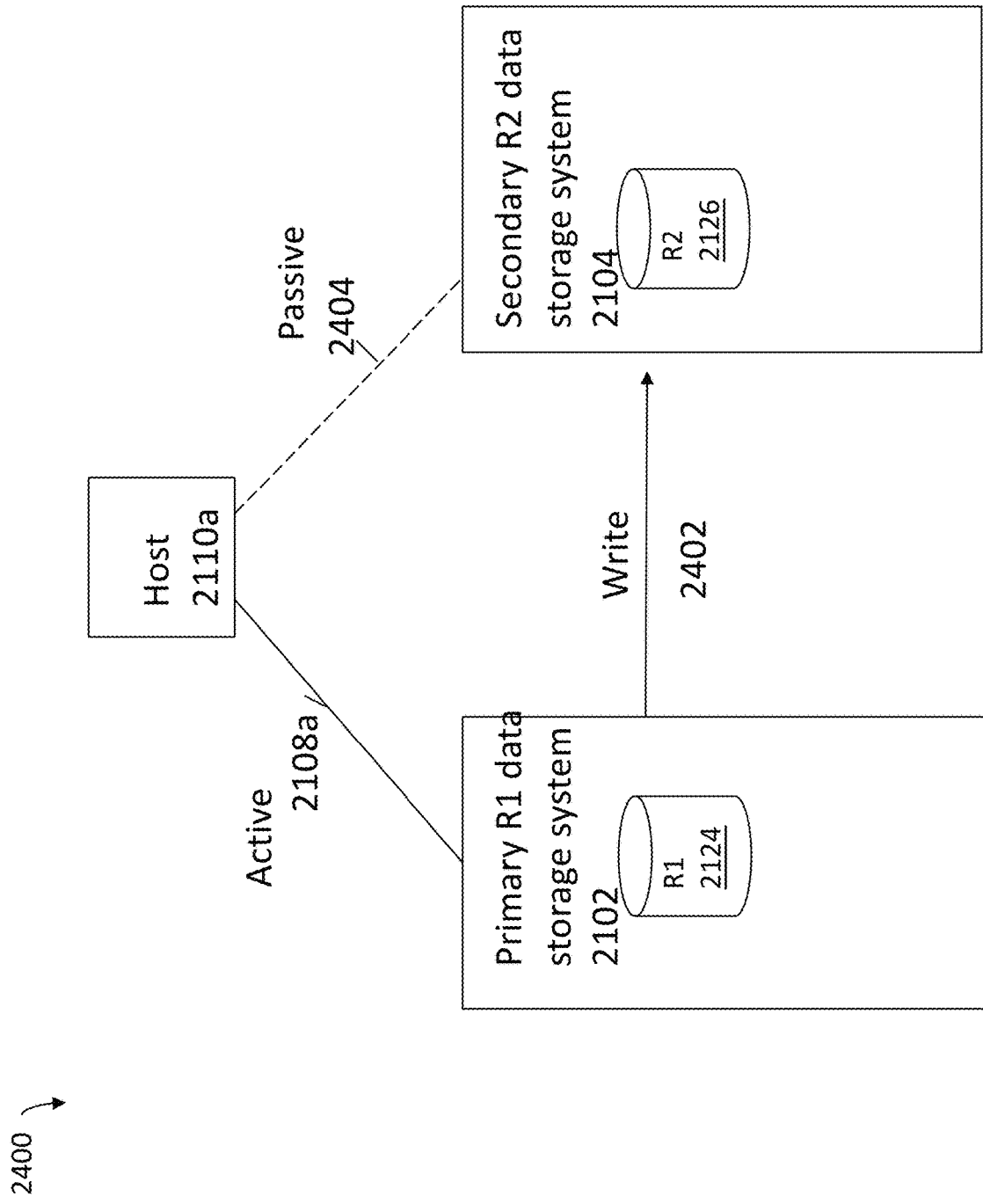

OVERLAPPING REPLICATION CYCLES FOR ASYNCHRONOUS REPLICATION

BACKGROUND

Technical Field

This application generally relates to data storage networks, and more particularly to managing overlapping replication cycles on storage systems on a storage network.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (I/O) operations utilizing a physical storage device of the storage system, one or more components of the host system, storage system and network components therebetween may be used. The one or more combinations of components of the host, switching fabric and storage system over which I/O operations between an application and the storage system may be communicated may be considered an I/O path between the application and the storage system. It should be appreciated that other combinations of components of a storage network, for example, two or more storage systems, also may be coupled together by one or more switches of a switching fabric. Thus, more generically, the one or more combinations of components of a first network component, switching fabric and second network component over which I/O communications may be communicated may be considered an I/O path between the two network components. The collective I/O paths between components of a storage network may be considered to define a connectivity of the storage network.

Host systems may not address the physical storage devices of a storage systems directly, but rather access to data may be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In some embodiments of the invention, a method is performed for a system including a first storage system, a second storage system, a third storage system and logical storage unit synchronously replicated between the first storage system and the second system, wherein the logical storage unit is asynchronously replicated from the first storage system to the third storage system and asynchronously replicated from the second storage system to the third storage system. The method includes: for a sequence of replication cycle numbers, designating a first series of alternating replication cycle numbers of the sequence to the first storage system and designating a second series of alternating replication cycle numbers of the sequence to the second storage system; in response to receiving a first write operation on the first storage system, determining whether a current cycle number on the first storage system is a cycle number included in the first series designated to the first storage system; and, if the current cycle number on the first storage system is a cycle number included in the first series, recording the first write operation in a first cycle buffer on the first storage system. The method further may include, prior to receiving the first write operation, synchronizing the first storage system and the second storage system to an initial cycle number. The method further may include: the first storage system determining to transition from a first cycle to a second cycle; and the first system transmitting an instruction to the second storage system to transition from the first cycle to the second cycle. The method further may include: the first system receiving an acknowledgement from the second system that the second system has transitioned to the second cycle; and, in response to receiving the acknowledgement, transitioning the first cycle on the first storage system from a capture phase to a transfer phase during which the write operations are transmitted from the first cycle buffer to the third storage system. The method of further may include: the second storage system receiving the instruction from the first storage system; the second system storage incrementing a current cycle number on the second storage system to a next cycle number; the second system storage acknowledging to a host system completion of any write operations being executed on the second system for the second cycle number; and, after the second system has acknowledged to the host system, the second storage system sending an acknowledgement to the instruction to the first system indicating that that second storage system has transitioned from the current cycle to a next cycle. The method further may include: prior to the first storage system receiving the acknowledgement, the first system receiving a second write request; the second storage system, in response to receiving the second write request, recording the second write operation in a second cycle buffer on the first storage system; and the second storage system, at a later point in time, transmitting the second write operation from the second cycle buffer to the third storage system. The method further may include, if the current cycle number on the first storage system is not a cycle number included in the first series, recording or not recording the first write operation in the first cycle buffer on the first storage system, where the first storage system does not transmit the first write operation from the first cycle buffer to the third storage system, except if the first write operation is recorded in the first cycle buffer and the second storage system fails to transmit the first write operation to the third storage system. The first storage system and the second storage system may be in an active-active configuration.

In other embodiments of the invention, a system including: a first storage system; a second storage system; a third storage system; a logical storage unit synchronously replicated between the first storage system and the second system, wherein the logical storage unit is asynchronously replicated from the first storage system to the third storage system and asynchronously replicated from the second storage system to the third storage system; and executable logic. The executable logic implements a method including: for a sequence of replication cycle numbers, designating a first series of alternating replication cycle numbers of the sequence to the first storage system and designating a second series of alternating replication cycle numbers of the sequence to the second storage system; in response to receiving a first write operation on the first storage system, determining whether a current cycle number on the first storage system is a cycle number included in the first series designated to the first storage system; and, if the current cycle number on the first storage system is a cycle number included in the first series, recording the first write operation in a first cycle buffer on the first storage system. The method further may include, prior to receiving the first write operation, synchronizing the first storage system and the second storage system to an initial cycle number. The method further may include: the first storage system determining to transition from a first cycle to a second cycle; and the first system transmitting an instruction to the second storage system to transition from the first cycle to the second cycle. The method further may include: the first system receiving an acknowledgement from the second system that the second system has transitioned to the second cycle; and, in response to receiving the acknowledgement, transitioning the first cycle on the first storage system from a capture phase to a transfer phase during which the write operations are transmitted from the first cycle buffer to the third storage system. The method further may include: the second storage system receiving the instruction from the first storage system; the second system storage incrementing a current cycle number on the second storage system to a next cycle number; the second system storage acknowledging to a host system completion of any write operations being executed on the second system for the second cycle number; and, after the second system has acknowledged to the host system, the second storage system sending an acknowledgement to the instruction to the first system indicating that that second storage system has transitioned from the current cycle to a next cycle. The method further may include: prior to the first storage system receiving the acknowledgement, the first system receiving a second write request; the second storage system, in response to receiving the second write request, recording the second write operation in a second cycle buffer on the first storage system; and the second storage system, at a later point in time, transmitting the second write operation from the second cycle buffer to the third storage system. The method further may include, if the current cycle number on the first storage system is not a cycle number included in the first series, recording or not recording the first write operation in the first cycle buffer on the first storage system, where the first storage system does not transmit the first write operation from the first cycle buffer to the third storage system, except if the first write operation is recorded in the first cycle buffer and the second storage system fails to transmit the first write operation to the third storage system.

In other embodiments of the invention, computer-readable media is provided for a system including a first storage system, a second storage system, a third storage system and logical storage unit synchronously replicated between the first storage system and the second system, wherein the logical storage unit is asynchronously replicated from the first storage system to the third storage system and asynchronously replicated from the second storage system to the third storage system, computer-readable media having software stored thereon. The software includes: executable code that for a sequence of replication cycle numbers, designates a first series of alternating replication cycle numbers of the sequence to the first storage system and designates a second series of alternating replication cycle numbers of the sequence to the second storage system; executable code that, in response to receiving a first write operation on the first storage system, determines whether a current cycle number on the first storage system is a cycle number included in the first series designated to the first storage system; and executable code that, if the current cycle number on the first storage system is a cycle number included in the first series, records the first write operation in a first cycle buffer on the first storage system. The software further may include executable code that, prior to receiving the first write operation, synchronizes the first storage system and the second storage system to an initial cycle number. The computer-readable media wherein the software further may include: executable code that controls the first storage system to determine to transition from a first cycle to a second cycle; and executable code that controls the first system to transmit an instruction to the second storage system to transition from the first cycle to the second cycle. The software further may include: executable code that controls the first system to receive an acknowledgement from the second system that the second system has transitioned to the second cycle; and executable code that, in response to receiving the acknowledgement, transitions the first cycle on the first storage system from a capture phase to a transfer phase during which the write operations are transmitted from the first cycle buffer to the third storage system. The software further may include: executable code that controls the second storage system to receive the instruction from the first storage system; executable code that controls the second system storage to increment a current cycle number on the second storage system to a next cycle number; executable code that controls the second system storage to acknowledge to a host system completion of any write operations being executed on the second system for the second cycle number; and executable code that controls the second storage system to send, after the second system has acknowledged to the host system, an acknowledgement to the instruction to the first system indicating that that second storage system has transitioned from the current cycle to a next cycle.

BRIEF DESCRIPTION OF THE DRAWINGS

Features and advantages of the present invention will become more apparent from the following detailed description of illustrative embodiments thereof taken in conjunction with the accompanying drawings in which:

FIG. 4 a block diagram illustrating an example of a table used for a thin logical device, according to embodiments of the invention;

FIG. 5 is a block diagram illustrating an example of a data structure for mapping logical storage unit tracks to cache slots, according to embodiments of the invention;

FIGS. 6A-6C are examples of various embodiments of components configured for replication, according to embodiments of the invention;

DETAILED DESCRIPTION OF EMBODIMENTS

Figure 1A:
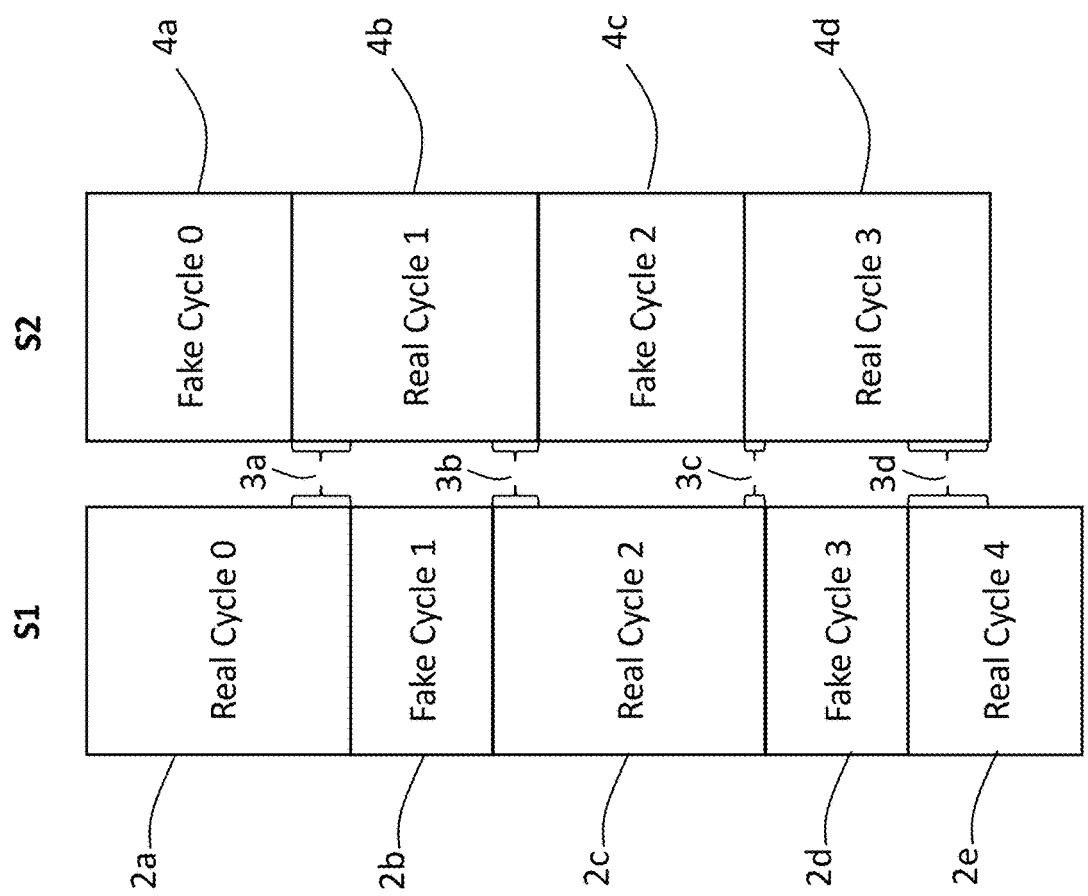
FIG. 1A is a block diagram illustrating overlapping cycles on R1 and R2, according to embodiments of the invention.

Some data storage networks may include two data storage systems, where, for one or more LSUs, the LSU is synchronously replicated between the two storage systems, which may be configured in an active-active configuration, as described in more detail elsewhere herein. Two storage systems in such a configuration with respect to an LSU may be referred to as peer storage systems, and the LSU in such an arrangement may be referred to herein as a "shared" or "stretched" LSU. Replication of an LSU between two storage systems, whether synchronous or asynchronous, may be referred to herein as "remote replication" to distinguish from local replication in which an LSU is replicated to another location (e.g., another physical storage device) on a same storage system.

Some storage networks may include a third storage system, and a shared LSU may be asynchronously replicated to the third storage system, which may be referred to herein as a "target system." There are many possible ways for the shared LSU of the peer storage systems to be asynchronously replicated to the target system, where each way may utilize asynchronous replication cycles, described in more detail elsewhere herein, to maintain a consistent state of the LSU on the target system. As described in more detail elsewhere herein, asynchronous remote replication (ARR) may include a plurality of asynchronous replication cycles (also referred to herein as "replication cycles" or "cycles") for an LSU of a source storage system (S1) being replicated (e.g., "R1"), each cycle corresponding to a period of time and specifying write operations for portions (i.e., "tracks") of R1 that were initiated on the source storage system during the period of time represented by the cycle. Each cycle may transition through four phases—two phases on S1 and two phases on the target storage system (S2). The two phases on S1 may include a capture phase during which the write operations for R1 are captured or collected, after which the cycle transitions into a transfer phase during which the write operations for R1 are transmitted from S1 to S2 to be updated for the paired LSU (R2) on S2. On S2, the cycle begins in a receive phase during which write operations transmitted as part of the transfer phase on S1 are received on S2, and transitions to an apply phase during which the write operations are applied to R2.

Asynchronous replication cycles may be numbered 0, 1, 2, etc., and the period of time corresponding to each cycle may range from seconds (or less) to minutes to hours (or more). The periods of time for each cycle may be predefined to be a same length of time, and may be derived, for example, from a recovery point objective (RPO). The data (e.g., the write operations) of a cycle may be transmitted from S1 to S2 during the transfer phase in any order, and S2 will store the cycle data in a temporary buffer as part of the receive phase. To maintain write consistency, S2 will not enter the apply phase and apply (i.e., commit to R2) the cycle data until two conditions are met:

Condition A: The entire cycle has been received on S2; and

Condition B: All previous cycles received on S2 for R2 have been applied to R2.

For example, in a remote replication configuration involving two storage systems, a source storage system (S1) and a target storage system (S2), it is possible that cycle 8 on S1 is in the capture phase collecting write operations for a source LSU (R1), while cycles 4, 5, 6 and 7 for R1 are in a transfer phase being transmitted from S1 to S2. It is possible that S2 has already received and applied cycles 0, 1, 2, 3 to the target LSU (R2) and is in the process of receiving cycles 4, 5, 6, 7. Per Condition A above, S2 will apply cycle 4 only after it has fully arrived, even if more recent cycles (for example, cycle 5) have arrived. Of course, it is possible that S1 will not create a new cycle if it has too many pending, or that it will not start transmitting cycles 5-7 before finishing sending cycle 4. In any event, ARR should work correctly, and preserve write consistency, as long as Conditions A and B are satisfied.

It should be appreciated that, in descriptions herein of a remote replication configuration involving only two storage systems, the source storage system may be referred to herein as S1 and the source LSU thereon being replicated as R1, and the target storage system may be referred to as S2 the target LSU thereon as R2. In contrast, for a remote replication configuration involving three storage systems, where a first and second storage system are synchronously replicating a shared LSU, and asynchronously replicating the shared LSU to a third storage system: the first storage system may be referred to herein as "S1," the instance of the shared LSU on the first storage system may be referred to herein as "R1;" the second storage system may be referred to herein as "S2;" the instance of the shared LSU on the second storage system may be referred to herein as "R2;" the third storage system may be referred to herein as "S3;" the target LSU on the third storage system may be referred to herein as "R3;" and the shared LSU may be referred to more generally (e.g., independent of either instance) as R12."

As noted above, there are many possible ways for a shared LSU (R1) of peer storage systems (S1 and S2) to be asynchronously replicated to a target LSU (R3) of a target system (S3). A first solution is to have both S1 and S2 asynchronously replicate all cycles to S3. However, this solution would result in inefficient use of system resources as both S1 and S2 are doing the full work of a source storage system performing ARR and S3 is doing double the work of a target storage system performing ARR, as it processes each write operation of every cycle twice.

Another solution is to have only one of the peer storage systems (S1 or S2) perform asynchronous replication for all cycles. While this solution would preserve more overall system resources than the first solution, the overall system resources are still inefficiently used, as one of the peer storage systems does all of the work of an ARR source system, while the other peer storage system does not do any of the ARR work. If S1 and S2 could share the work of an ARR source storage system, it would be less likely that the resources (e.g., cache memory) of either S1 of S2 become constrained.

A third possible solution is that S1 and S2 share the processing of cycles in a synchronized fashion to ensure the write consistency is maintained on S3. For example, S1 may perform ARR with S3 for all even-numbered cycles (0, 2, 4

. . . ), and S2 may perform ARR with S3 for all odd-numbered cycles (1, 3, 5, . . . ). To ensure that the cycles are synchronized on S1 and S2—i.e., that each cycle starts and ends with the same write operations on S1 and S2, during a transition between cycles, S1 and S2 may pause the initiating of write operations on S1 and S2 until S1 and S2 exchange communications (e.g., handshake signals) to ensure synchronization of cycles before S1 and S2 resume initiating write operations. However, this solution would hurt performance by increasing response times of write operations around the time of cycle transition, possibly leading to more systemic performance issues over time.

What may be desirable is a way for peer storage systems to share the workload of asynchronously replicating a shared LSU to a target system with less performance degradation than a solution that involves synchronization of asynchronous replication cycles between peer storage systems.

Described herein are techniques and mechanisms for peer storage systems to share the workload of asynchronously replicating a shared LSU to a target system with less performance degradation than a solution that involves strict synchronization of asynchronous replication cycles between peer storage systems. Peer storage systems (S1 and S2) that synchronously replicate a shared LSU (R12; e.g., in an active-active configuration) may share the workload of asynchronously replicating the shared LSU to a target system (S3) by dividing ownership of the replication cycles in an alternating manner without a strict synchronization of cycles between the peer storage systems. Rather, a given cycle number (e.g., Cycle 1) on S1 may not start and end with a same write operation as a same cycle number (Cycle 1) on S2, such that cycles on S1 (e.g., Cycle 1 and Cycle 2) may overlap with cycles having the same number (Cycle 1 and Cycle 2) on S2. S1 may asynchronously replicate to S3 only the cycles it owns, and S2 may asynchronously replicate to S3 only the cycles it owns to S3.

In some embodiments, for a sequence of cycle numbers (0, 1, 2, 3 . . . ), S1 may be designated as the owner of a first series of alternating replication cycle numbers of the sequence (e.g., even numbers 0, 2, 4 . . . ) and S2 may be designated as the owner of a second alternating sequence of replication cycle numbers of the sequence (e.g., odd numbers 1, 3, 5, . . . ). After designating ownership of cycle numbers, and before activating ARR between S1, S2 and S3, S1 and S2 may exchange communications to synchronize to an initial cycle (e.g., Cycle 0) so that S1 and S2 may be synchronized for at least the beginning of the initial cycle—i.e., Cycle 0 on both S1 and S2 may be with a same write operation. Such synchronization may include S1 and S2 setting a respective current cycle number parameter on S1 and S2, respectively, to the initial cycle number.

On a first peer storage system (S1), in response to receiving a first write operation, it may be determined whether a current cycle number (N) on S1 is owned by S1. If so, S1 may record the write operation in a cycle buffer for Cycle N, for example, as part of a capture phase of Cycle N. On the other peer system (S2), when it receives a write operation (e.g., the same first write operation, for example, from S1 as part of synchronous replication), S2 may determine that it does not own the current cycle number, N. In response to this determination, S2 may treat Cycle N as a fake cycle. As used herein, a "fake cycle" on a peer storage system with respect to an asynchronously replicated shared LSU is a cycle not owned by the storage system. In contrast, on a peer storage system that is the owner of the cycle and for which the peer storage system records write operations in a cycle buffer and performs the asynchronous replication (e.g., transmits the write operation to R3), the cycle may be referred to herein as a "real cycle."

In some embodiments, when a current cycle on a peer storage system is a fake cycle, the peer storage system may not record any write operation received on the peer storage system. In other embodiments, when the current cycle is a fake cycle, the peer storage system may record write operations in a cycle buffer for the current cycle, but not ultimately transmit the write operations to S3. In such embodiments, the other peer storage system may send the peer storage system a notification when the other peer system has completed the transmission of write operations to S3 for the corresponding real cycle on the other peer system. In response to such notification, the peer storage system may discard all of the write operations it recorded during the fake cycle. The peer system may wait until such notification to discard the write operations in case the recorded write operations need to be transmitted to S3 in the event the other peer storage system fails before fully transmitting the write operations of the corresponding real cycle, as described in more detail elsewhere herein.

In some embodiments, as will become more clear from the descriptions herein, the beginning of real cycles on S1 may overlap with the end of real cycles on S2, and the beginning of real cycles on S2 may overlap with end of real cycles on S1, but fake cycles on S1 and S2 should never overlap. As should become clear from the descriptions herein, if fake cycles on S1 and S2 overlapped, it would be possible for a write operation to be included in a fake cycle on S1 and a fake cycle on S2, and thus not be included in a real cycle on either S1 or S2, such that the write operation never gets replicated to S3. Accordingly, embodiments of the invention may ensure that fake cycles never overlap. FIG. 1A provides a relative simple illustration of this aspect of the invention.

FIG. 1A is a block diagram illustrating overlapping cycles on R1 and R2, according to embodiments of the invention. S1 has cycles 2a-e, including real cycles 2a,c,e and fake cycles 2b,d, illustrating that S1 owns even cycles. S2 has cycles 4a-e, including fake cycles 4a,c and real cycles 4b,d, illustrating that S1 owns odd cycles. Element 3a points out the overlap between the end of real cycle 2a on S1 and real cycle 4b on S2. Element 3b points out the overlap between the end of real cycle 4b on S2 and real cycle 2c on S1. Element 3c points out the overlap between the end of real cycle 2c on S1 and real cycle 4d on S2. Element 3d points out the overlap between the end of real cycle 4d on S2 and real cycle 2e on S1. None of the fake cycles 2b,d on S1 overlap with any fake cycles 4a,4c on S2.

It should also be appreciated that the overlap between real cycles, in terms of the number of write operations, may be significantly less than the length of the cycles, even more than illustrated in FIG. 1A. For example, if cycles times are defined to be on the order of seconds, and there is a lot of I/O activity for the shared LSU, there may orders of magnitude more write operations in a portion of the real cycle that do not overlap than in the portion of the cycle that overlaps with a cycle on the other peer storage device. Thus, while embodiments of the invention may not provide strict synchronization of cycles between S1 and S2, embodiments may provide what may be considered soft synchronization.

In response to determining that it is not the owner of the current cycle, N, S2 may treat it as a fake cycle and either: not record any write operations received while the current cycle is N, or record the write operations, but discard them unless the corresponding real cycle on S1 fails. Concurrently, S1 as the owner of the current cycle may continue to record received write operations (e.g., from a host or replicated from S2) in the cycle buffer for Cycle N. When S1 determines that it is time to transition to a next cycle, N+1, S1 may send S2 an instruction to transition to the next cycle. For example, each cycle, including Cycle N, may correspond to a predefined period of time, and it may be determined by S1 that that period of time for Cycle N has elapsed or will elapse soon, which triggers S1 to send the transition instruction to S2. Concurrently S1 continues to receive and record write operations for Cycle N in the Cycle N buffer on S1.

When S2 receives the transition instruction, S2 may update its cycle counter to Cycle N+1, and start recording write operations received at S2 (e.g., from a host or from S2 as part of synchronous replication) in a cycle buffer for N+1. Unlike its treatment of Cycle N as a fake cycle, S2 may treat Cycle N+1 as a real cycle by ultimately performing asynchronous replication with S3 for Cycle N+1 by transmitting the write operations from the Cycle N+1 to S3.

Concurrently to S2 starting to record write operations for Cycle N+1, S2 may verify that there are no pending write operations from a host on S2 for Cycle N (for the shared LSU); i.e., that any write operations from a host that were initiated on S2 for Cycle N have been acknowledged to the host. In some embodiments, this may include S2 having staged the write operation to cache, and, in accordance with synchronous replication with S1, having transmitted the write operation to S1 and received an acknowledgement that S1 has committed the write operation (e.g., by staging it in its own cache).

After S2 has confirmed that there are no pending write operations remaining for Cycle N, S2 may send S1 an acknowledgement that S2 has transitioned to the next cycle, N+1. The reason it may be desirable to verify that there are no pending write operations from a host on S2 for Cycle N before sending S1 an acknowledgement that S2 has transitioned to the next cycle, N+1, is to ensure that any pending write operations for cycle N are recorded in a cycle buffer on S1, and thus ultimately replicated to S3. As Cycle N is a fake cycle on S2, a write operation for Cycle N on S2 should not ultimately be replicated to R3. Thus, if, in response to the acknowledgment that S2 has transitioned to N+1, S1 increments to Cycle N+1 before a pending write operation for Cycle N on S2 is committed to S1, the write operation may become part of Cycle N+1 on S1, which also is a fake cycle. As a result, the write operation is associated with fake cycle N on S2 and associated with fake cycle N+1 on S1 and is never replicated to S3. For this reason, it may be desirable to verify that there are no pending write operations from a host on S2 for Cycle N before sending S1 an acknowledgement that S2 has transitioned to the next cycle, N+1.

It should be appreciated that, during the period of time between S1 sending the transition instruction to S2 and receiving the acknowledgement from S2 (which may be referred to herein as the "transition period"), S1 may have continued to record write operations as part of Cycle N—e.g., S1 remains in the capture phase for Cycle N. That is, write operations received on S1 during the transition period may be associated with Cycle N on S1 and recorded in a Cycle N buffer on S1, whereas write operations received on S2 during the transition period, after S2 increments in cycle number the instruction from S1, may be associated with Cycle N+1 on S2 and recorded in a Cycle N+1 buffer on S2. Thus, the end of Cycle N on S1 may overlap with the beginning of Cycle N+1 on S2.

More generally, write operations received on (and synchronously replicated between) S1 and S2 during the transition period may be associated with different cycles on S1 and S2, including being stored in cycle buffers for different cycles on each storage system, such that the different real cycles overlap, and a same write operation may be associated with different cycles on S1 and S2, e.g., near the end of one cycle on S1 and near the beginning of a next cycle on S2 or vice versa. This aspect of the invention is illustrated by the overlaps 3a, 3b, 3c and 3d in FIG. 1A.

In response to receiving the transition acknowledgement from S2, S1 may increment its cycle counter to N+1, transition Cycle N to the transfer phase and start transmitting write operations in the cycle N buffer to S3 for R3, and treat Cycle N+1 as a fake cycle on S1. Depending on how S1 is configured to treat fake cycles, S1 either may not record write operations for Cycle N+1 or record write operations received on S1 in a Cycle N+1 buffer, but discard them unless the full transmission of the corresponding real cycle on S2 fails. Regarding the transmission of write operations from the Cycle N buffer to S3, S1 may notify S2 when S1 has completed transmitting all of the write operations (e.g., has received an acknowledgement from S3 for each write operation that S3 has committed the write operation on S3). In response to receiving the notification, S2 may discard any write operations it may have recorded in a cycle buffer for the corresponding fake cycle N on S2.

Regarding Cycle N+1, S1 may continue to associate received write operations with Cycle N+1 and treat them as configured for a fake cycle until S1 receives a transition instruction from S2, in response to which S1 may transition to a Cycle N+2 in a same, reciprocating manner as described above with respect to S2 when S2 received a transition instruction from S1 to transfer to N+1. S2, for its part, may have continued to associate received write operations with Cycle N+1 and handle such write operations as described above until S2 determines it is time to transition to Cycle N+2, at which time it may send the transition instruction to S1 to transfer to Cycle N+2 and continue to associate write operations with N+1 until it receives a transition acknowledgment from S1. Accordingly, write operations received on S2 during the transition period from N+1 to N+2 may be associated with Cycle N+1 on S2, and may be recorded in a Cycle N+1 buffer on S2, whereas write operations received on S1 during this transition period may be associated with Cycle N+2 on S1 and recorded in a Cycle N+2 buffer on S1. Thus, the end of real Cycle N+1 on S2 may overlap with the beginning of real Cycle N+2 on S1.

The above process of transitioning between cycles on S1 and S2 may continue indefinitely, during which time each of S1 and S2 may continue to transmit write operations from the cycle buffers of cycles that it owns (i.e., its real cycles) to S3 in any order as part of ARR, and communicate to S3 each time a transmission of a cycle to S3 is complete. Further, S1 and S2 may be transferring different cycles concurrently to S3. S3 may be configured to enforce Conditions A and B to ensure consistency, regardless of the order in which cycles and write operations thereof are received.

The overlapping of real cycles should not impact the write consistency of the ARR, as redundant write operations should overwrite the same data for R3 on S3. For example, if the same write operation is captured as part of Cycle N+1 (e.g., near the end of the cycle) on S1 and captured as part of Cycle N+2 (e.g., near the beginning of the cycle) on S2, the write operation may first be applied to R3 for Cycle N+1 per Condition B, and then the same write operation should be applied to R3 for Cycle N+2.

In the event of a failure of S1 or S2, the manner of recovery may depend on how the surviving peer storage system treats fake cycles. Regardless of how fake cycles are treated on the surviving peer storage system, ownership of all cycles may be transferred to the surviving storage system so that the surviving storage system handles the transfer of the write operations to S3 for all cycles of the shared LSU until the failed peer storage system recovers. For cycles being processed on S1 and S2 (e.g., in the capture and transfer phases) when one of them fails, if the surviving peer storage system stores write operations for fake cycles, recovering may include transferring the write operations from the surviving peer storage system's fake cycle buffers to S3.

If the surviving peer storage system does not store write operations for fake cycles, then cycles being processed on S1 and S2 (e.g., in the capture and transfer phases) when one of them fails may need to be handled differently than as described above, as the write operations associated with real cycles on the failed peer storage system and fake cycles on the surviving peer storage system are not in any surviving cycle buffer. In such cases, the surviving peer storage system may use a most recent local snapshot (if any) to recover data up until the point in time of the local snapshot. For any write operations since the point in time, the surviving peer storage system may determine any changes to data since the point in time using any of a variety of techniques—e.g., comparing the state of data from the last snapshot for a shared LSU to the current state of the LSU—and transmit any changes to the data as part of a first replication cycle transmitted to S3 during recovery. Other techniques may be used.

Illustrative embodiments of the invention will now be described in more detail in relation to the figures.

Figure 1B:
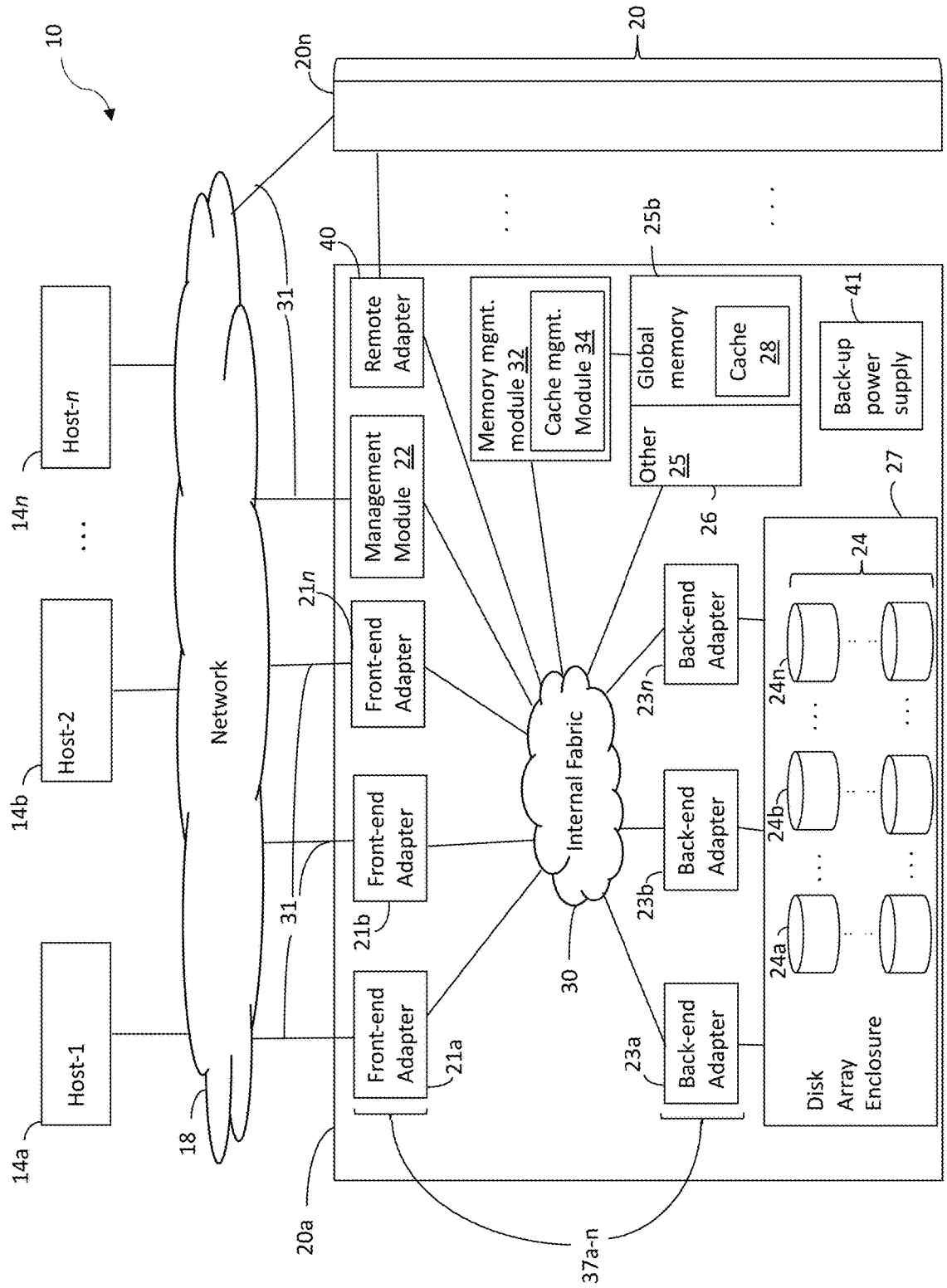
FIG. 1B is a block diagram illustrating an example of a data storage network, according to embodiments of the invention.

FIG. 1B illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a switching fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1B, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more front-end adapters ("FAs") 21a-n (e.g., directors configured to serve as FAs), which also are referred to herein as host adapters ("Hs"). Each of these FAs may be used to manage communications and data operations between one or more host systems and global memory (GM) 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing I/O operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (TB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1B as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

The memory 26 may include persistent memory for which for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof— e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

Storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
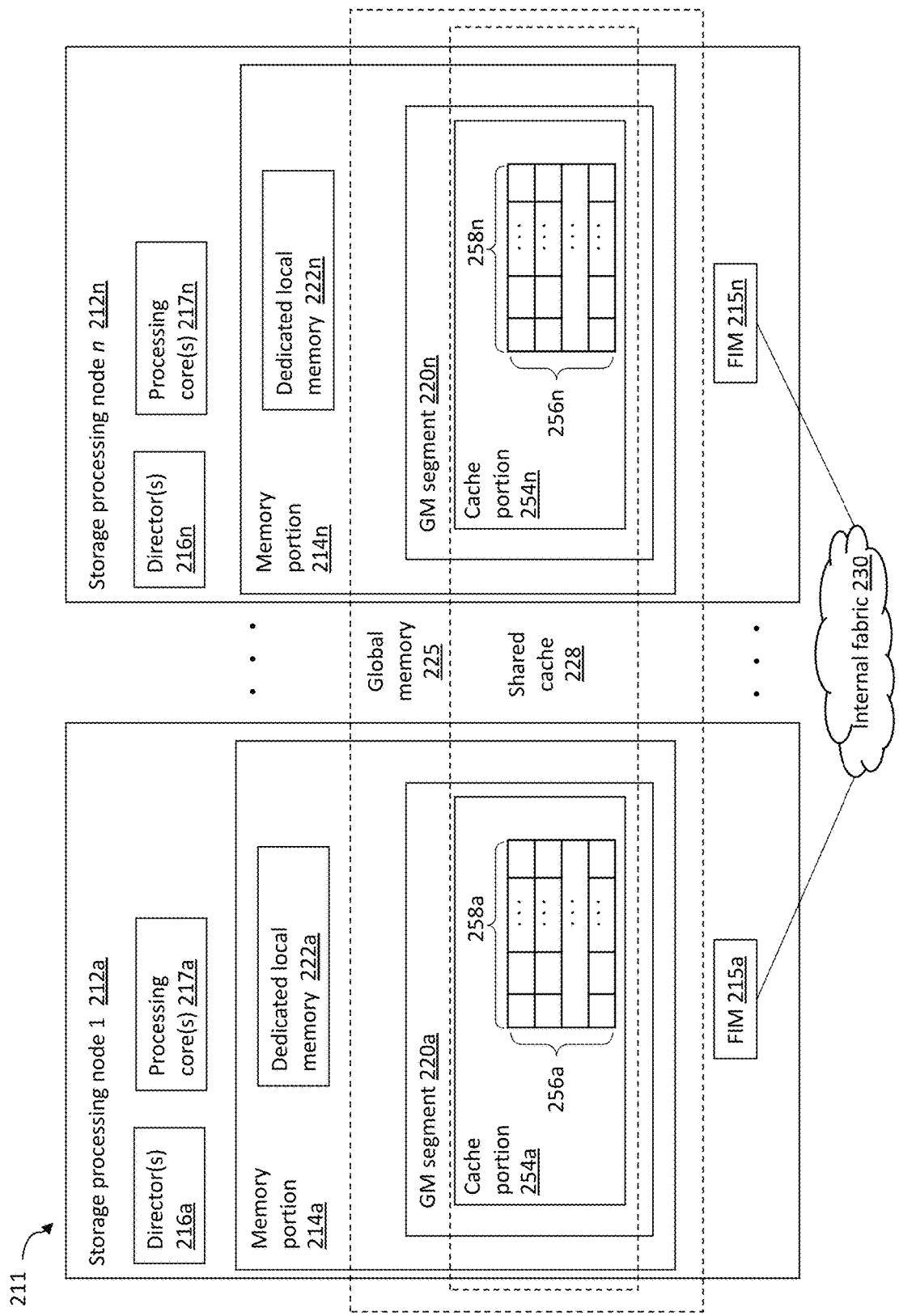
FIG. 2 is a block diagram illustrating an example of a storage system including multiple physically discrete storage processing nodes, according to embodiments of the invention.

Any of storage systems 20a-n, or one or more components thereof, described in relation to FIGS. 1-2 may be implemented using one or more Symmetrix™, VMAX™, VMAX3™ or PowerMax™ systems made available from Dell EMC.

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1B, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple, physically discrete storage processing nodes (e.g., circuit boards) 212a-212n, which may be referred to herein as "processing nodes." Storage system 211 may include a plurality of processing nodes 212a-212n and a fabric 230 (e.g., internal fabric 30) over which the processing nodes 212a-n may communicate. Each of the processing nodes 212a-212n may include components thereon as illustrated. The switching fabric 230 may include, for example, one or more switches and connections between the switch(es) and processing nodes 212a-212n. In at least one embodiment, the fabric 230 may be an IB fabric. In some embodiments, multiple processing 212a-n nodes may be implemented on a single physically discrete component; e.g., two processing nodes 212a-n may be implemented on single engine of PowerMax storage system.

In the following paragraphs, further details are described with reference to processing node 212a but each of the N processing nodes in a system may be similarly configured. For example, processing node 212a may include any of: one or more directors 216a (e.g., directors 37a-n); memory portion 214a; one or more processing cores 217a including compute resources, for example, as part of a CPUs and/or a CPU complex for processing I/O operations; and a fabric interface module (FIM) 215a for interfacing the processing node 212a to an internal fabric 230. Each director 216a may be configured to operate, such as by executing code, as any one or more of an FA, BE, RA, and the like. In some embodiments, each of the directors, or a portion thereof, are implemented in software stored in a memory portion 214a (e.g., in a dedicated local memory 222a) that is executed by one or more of the processing cores 217a. Such software implementation of directors may be considered emulations of types of physical directors (i.e., directors implemented (at least primarily) in hardware).

Each FIM 215a-n may include one or more host channel adapters (HCAs) that physically couple, and are configured to enable communication between, its respective processing node 212a-n, and the internal fabric 230. In some embodiments, the internal fabric 230 may include multiple (e.g., 2)

switches, and each HCA 215a-n may have multiple (e.g., 2) ports, each one connected directly to one of the switches.

Each of the processing nodes 212a-n may, respectively, also include memory portions 214a-n. The memory portion of each processing node may be characterized as locally accessible with respect to that particular processing node, and more specifically with respect to other components on the same processing node. For example, processing node 212a includes memory portion 214a which is memory that is local to that particular processing node 212a. Data stored in memory portion 214a may be directly accessed by any of the processing cores 217a (e.g., executing instructions on behalf of one of the directors 216a) of the processing node 212a. For example, memory portion 214a may be a fast memory (e.g., DIMM (dual inline memory module) DRAM (dynamic random access memory)) that is locally accessible by a director 216a, where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of processing nodes 212a-n may be further partitioned into different portions or segments for different uses. For example, each of the memory portions 214a-214n may respectively include GM segments 220a-n configured for collective use as segments of a distributed GM, for example, GM 225 (e.g., GM 25b). Thus, data stored in any GM segment 220a-n may be accessed by any director 216a-n on any processing node 212a-n. Additionally, each of the memory portions 214a-n may respectively include dedicated local memories 222a-n. Each of the dedicated local memories 222a-n are respectively configured for use locally by the one or more directors 216a-n, and possibly other components, residing on the same single processing node. In at least one embodiment where there is a single director denoted by 216a (and generally by each of 216a-n), data stored in the dedicated local memory 222a may be accessed by the respective single director 216a located on the same processing node 212a. However, the remaining directors located on other ones of the N processing nodes may not access data stored in the dedicated local memory 222a.

To further illustrate, GM segment 220a may include information such as user data stored in the cache portion 220a, metadata, and the like, that is accessed (e.g., for read and/or write) generally by any director of any of the processing nodes 212a-n. Thus, for example, any director 216a-n of any of the processing nodes 212a-n may communicate over the fabric 230 to access data in GM segment 220a. In a similar manner, any director 216a-n of any of the processing nodes 212a-n may generally communicate over fabric 230 to access any GM segment 220a-n of the distributed GM. Although a particular GM segment, such as 220a, may be locally accessible to directors on one particular processing node, such as 212a, any director of any of the processing nodes 212a-n may generally access the GM segment 220a. Additionally, the director 216a also may use the fabric 230 for data transfers to and/or from GM segment 220a even though 220a is locally accessible to director 216a (without having to use the fabric 230).

Also, to further illustrate, dedicated local memory 222a may be a segment of the memory portion 214a on processing node 212a configured for local use solely by components on the single/same processing node 212a. For example, dedicated local memory 222a may include data described in following paragraphs which is used and accessed only by directors 216a included on the same processing node 212a as the dedicated local memory 222a. In at least one embodiment in accordance with techniques herein and as described elsewhere herein, each of the dedicated local memories 222a-n may include a local page table or page directory used, respectively, by only director(s) 216a-n local to each of the processing nodes 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the cache portion 254a, various metadata and/or structures, and other information, as described in more detail elsewhere herein. Consistent with discussion herein, the cache portion 254a, having cache slots allocated from GM segments 220a-n, may be used to store I/O data (e.g., for servicing read and write operations).

Each cache portion 254a-n may be a portion of a shared cache 228 (e.g., cache 28) distributed across the processing nodes 212a-n, where the shared cache 228 may be considered a part of the GM 225. The cache portion 254a-n may include a plurality of cache slots 256a-n, each cache slot including one or more (e.g., 16) sections 258a-n. Each cache slot 256a-n may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process I/O on storage system 20a, including data structures to manage the mapping of LSUs and locations thereon to physical storage devices and locations thereon. Such data structures may be stored in any of memory 26, including GM 25b and memory 25a, GM segment 220a-n and/or dedicated local memories 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3:
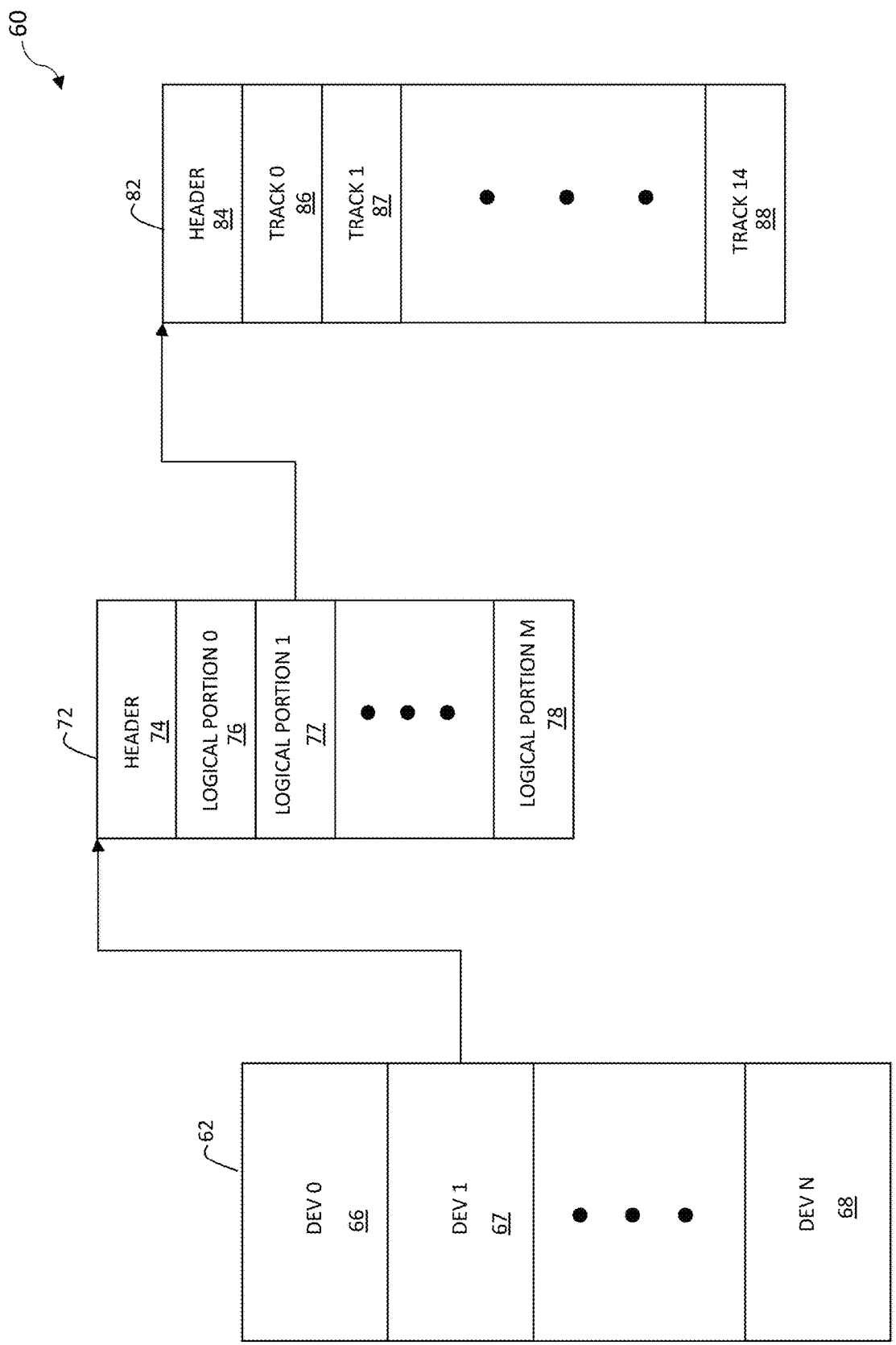
FIG. 3 is a block diagram illustrating an example of tables defining relationships between logical storage units and physical storage devices on a data storage system, according to embodiments of the invention.

FIG. 3 is a block diagram illustrating an example of tables 60 defining relationships between LSUs and physical storage devices on a data storage system, according to embodiments of the invention. A first table 62 corresponds to the LSUs (e.g., logical deices) used by a storage system (e.g., storage system 20a) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. As used herein, a "track" or "LSU track" represents a contiguous segment of physical storage space on a physical storage device. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20*a* (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 300, described in more detail elsewhere herein. Thus, the LSU track table 82 may be used to map logical addresses of an LSU corresponding to the tables 62, 72, 82 to physical addresses within physical storage devices of a storage system and/or to cache slots within a cache. In some embodiments, each entry 86-88 may specify a version of the data stored on the track. A sub-element of an LSU, for example, a logical storage portion or track, may be referred to herein as a logical storage element (LSE).

FIG. 4 is a diagram illustrating an example of a table 72' used for a thin logical device (i.e., a thin LSU), which may include null pointers as well as entries similar to entries for the LSU table 72, discussed above, that point to a plurality of LSU track tables 82*a*-82*e*. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the data portion maintains the null pointer that was written at initialization.

FIG. 5 is a block diagram illustrating an example of a data structure 300 for mapping LSU tracks (e.g., thin device tracks) to cache slots of a cache. Data structure 300 may be referred to herein as a "cache slot table." The cache slot table 300 may include a plurality of entries (i.e., rows) 302, each row representing an LSU track (e.g., any of LSU tracks 86-88 in track table 82) identified by an LSU ID in column 304 and an LSU track ID (e.g., number) identified in column 306. For each entry of the cache slot table 300, a column 312 may specify (e.g., using a cache slot ID and/or memory address) a cache location in a cache corresponding to the logical storage device track specified by columns 304 and 306. A combination of an LSU identifier and LSU track identifier may be used to determine from columns 304 and 306 whether the data of the identified LSU track currently resides in any cache slot identified in column 312. Through use of information from any of tables 62, 72, 72' and 82 described in more detail elsewhere herein, the one or more LSU tracks of an LSU specified in an I/O operation can be mapped to one or more cache slots. Further, using the same data structures, the one or more physical address ranges corresponding to the one or more LSU tracks of the LSU may be mapped to one or more cache slots.

Each of the entries 302 of the cache slot table also may specify: cache lock information in a column 314, replication information in a column 316, and other cache information in a column 318. The cache lock information may indicate whether or not the cache slot represented by the entry is locked, and if locked, the process ID of the entity that owns the lock. The entity may be, for example: an FA executing a write operation from a host; an RA replicating a write operation from the cache slot to R2, or replicating a write operation from R2 into the cache slot; or a BE de-staging data in the cache to a physical storage device or reading data from a PSD into the cache slot. The replication information may specify information relative to replication, for example, the replication cycle number currently associated with the cache slot, the replication (e.g., RDF) group associated with the cache slot (i.e., associated with the R1 track currently mapped to the cache slot, a type of cache slot (e.g., normal or duplicate), and other information. A normal cache slot type may indicate that a cache slot is handled per normal processing, i.e., when there is not a cache lock conflict resolution involved, for example, as described herein. A duplicate cache slot type may indicate that a cache slot is a duplicate of a cache slot used to resolve a cache slot lock conflict, which is not handled in the standard manner, but rather, is handled differently to resolve the cache slot lock, for example, as described herein.

The other cache slot information in the column 318 may include information about the status of writes to one or more portions (e.g., sectors) of the R1 track corresponding to the cache slot, e.g., whether the write is pending or complete. Completing the write may include writing it to a PSD on S1 (e.g., de-staging it from cache) and receiving acknowledgement from S2 (and perhaps other remote storage systems to which the LSU in question is being replicated) that the replicated data is committed on S2 (and other remote storage systems if any).

It should be appreciated that the cache slot table 300 may be used for purposes independent of any LSU tracks mapped thereto. That is, a cache slot ID or memory address in cache pointer column 312 may be used as a key to access, and modify as necessary, cache metadata about a cache slot, including any of the information in columns 314, 316 and/or 318.

The tables 62, 72, 72', 82 and 300 may be stored in the GM 26 of the storage system 20*a* during operation thereof and may otherwise be stored in non-volatile memory (i.e., with the corresponding physical storage device). In addition, tables corresponding to LSUs accessed by a particular host may be stored in local memory of the corresponding one of the FAs 21a-n. In addition, RA 40 and/or the BEs 23a-n also may use and locally store portions of the tables 62, 72, 72', 82 and 300. Other data structures may be stored in any of GM 25b, memory 25a, GM segment 220a-n and/or dedicated local memories 22a-n.

Any of the information contained in any of the data structures 62, 72, 72', 82 and 300, for example, the information included in the LSU track table 82 and the cache slot table 300, may be combined in a single data structure, which may be referred to herein as an LSU track metadata table. In some embodiments, a cache slot table 300 may be maintained separately from an LSU track metadata table. In such embodiments, the entries 302 of the cache slot table 300 may be indexed/keyed by a cache slot ID and/or memory address in the column 312, may identify the LSU track currently mapped to the slot (if any) in columns 304 and 306, may include cache lock info in the column 314, and may include other cache info. In such embodiments, the LSU track table may include: information about the LSU track described in relation to the LSU track table 82; replication information described in relation to the column 316; the cache slot (of any) currently mapped to the LSU track; and any other information described in relation to the cache slot table 300.

In some embodiments of the invention, data replication may be employed between two or more storage systems on a storage network, which may before referred to herein as "remote data replication" to distinguish it from "local data replication," which may be used herein to refer to data replication performed within a single storage system. Referring back to FIG. 1B, the RA (remote adapter) 40 may be configured to facilitate communication between data storage systems, such as between two of the same or different types of data storage systems. In one embodiment described in more detail in following paragraphs and figures, the RAs of the different data storage systems may communicate over a Gigabit Ethernet or Fibre Channel transmission channel supporting messaging traffic between data storage systems. The RA (e.g., RA 40) may include hardware including a processor used to facilitate communication between data storage systems, such as between two data storage systems. The RA may be used with the Dell EMC™ Symmetrix® Remote Data Facility (SRDF®) products. Dell EMC™ SRDF® is a family of products that facilitates the data replication from one data storage array to another through a Storage Area Network (SAN) or and IP network. Dell EMC™ SRDF® logically pairs a device or a group of devices from each array and replicates data from one to the other synchronously or asynchronously. Generally, the Dell EMC™ SRDF® products are one example of commercially available products that may be used to provide functionality of a remote data facility (RDF) for use in an embodiment in connection with techniques herein.

Figure 6A:
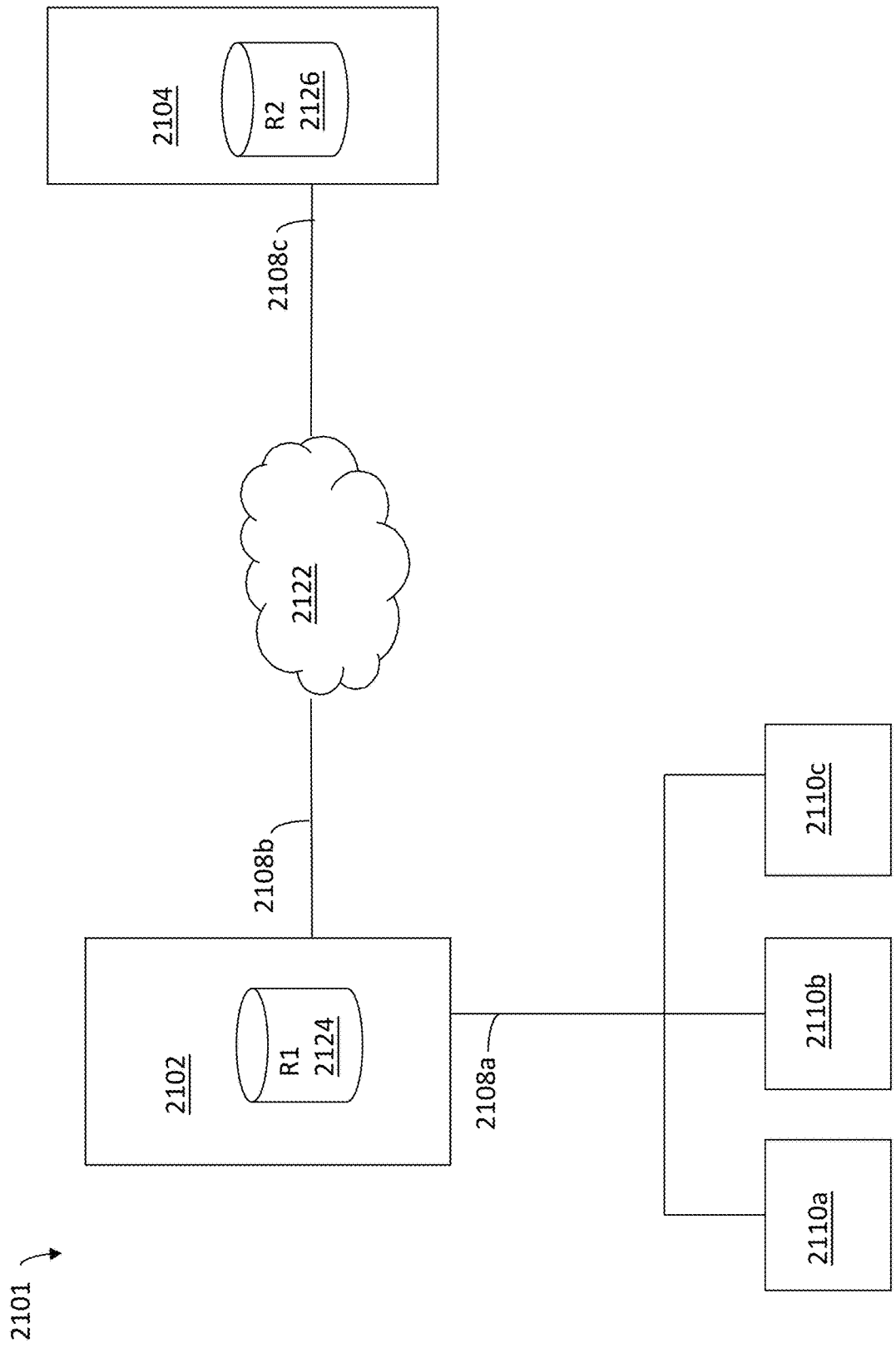

Referring to FIG. 6A, shown is an example of an embodiment of a system 2101 that may be used in connection with the techniques described herein. It should be noted that the embodiment illustrated in FIG. 6A presents a simplified view of some of the components illustrated in FIG. 1B, for example, including only some detail of the data storage system 20a for the sake of illustration.

Included in the system 2101 are data storage systems 2102 and 2104 and hosts 2110a, 2110b and 1210c. The data storage systems 2102, 2104 may be remotely connected and communicate over network 2122, such as the Internet or other private network, and facilitate communications with the components connected thereto. Hosts 2110a, 2110b and 2110c may perform operations to data storage system 2102 over connection 2108a. The hosts 2110a, 2110b and 2110c may be connected to the data storage system 2102 through connection 2108a which may be, for example, network or other type of communication connection. Although not illustrated, the hosts 2110a-2110c also may be directly connected to a network such as the Internet.

The data storage systems 2102 and 2104 may include one or more LSUs (e.g., logical storage devices). In this example, data storage system 2102 includes LSU R1 2124 and data storage system 104 includes LSU R2 2126. Both of the data storage systems may include one or more other logical and/or physical devices. Data storage system 2102 may be characterized as local with respect to hosts 2110a, 2110b and 2110c. Data storage system 104 may be characterized as remote with respect to hosts 2110a, 2110b and 2110c. The R1 and R2 LSUs may be configured as LUNs.

The host 2110a may issue a command, such as to write data to LSU R1 of data storage system 2102. In some instances, it may be desirable to copy data from the LSU R1 to another second LSU, such as R2, provided in a different location so that if a disaster occurs that renders R1 inoperable, the host (or another host) may resume operation using the data of R2. Such a capability is provided, for example, by the Dell EMC™ SRDF® products. Communication between LSUs on different data storage systems using Dell EMC™ SRDF® is described, for example, in U.S. Pat. Nos. 5,742,792, 5,544,347, and 7,054,883, all of which are incorporated by reference herein. With Dell EMC™ SRDF®, a user may denote a first LSU, such as R1, as a master LSU and a second LSU, such as R2, as a slave LSU. Other incarnations of Dell EMC™ SRDF® may provide a peer to peer relationship between the local and remote LSUs. In this example, the host 2110a interacts directly with the LSU R1 of data storage system 2102, but any data changes made are automatically provided to the R2 LSU of data storage system 2104 using Dell EMC™ SRDF®. In operation, the host 2110a may read and write data using the R1 volume in 2102, and Dell EMC™ SRDF® may handle the automatic copying and updating of data from R1 to R2 in data storage system 2104.

As illustrated in connection with other figures herein, data storage system 2102 may have one or more RAs included therein to facilitate remote connections to the data storage system 2104. Communications between storage system 2102 and 2104 may be made over connections 2108b,2108c to network 2122. Data storage system 2104 may include one or more RAs for use in receiving the communications from the data storage system 2102. The data storage systems may communicate, for example, over Gigabit Ethernet connections supporting TCP/IP traffic. The Dell EMC™ SRDF® replication functionality may be facilitated with the RAs provided at each of the data storage systems 2102 and 2104. Performing remote data communications using SRDF® over a TCP/IP network is described in more detail in U.S. Pat. No. 6,968,369, Nov. 22, 2005, Veprinsky, et al., "Remote Data Facility Over an IP Network," which is incorporated by reference herein. In connection with Dell EMC™ SRDF®, a single RDF link, connection or path may be between an RA of the system 2102 and an RA of the system 2104. As described in more detail below, techniques are described for use in transmitting data over an RDF link, such as I/O traffic including write data in connection with performing remote data replication over the RDF link between the systems 2102 and 2104.

An embodiment also may include the concept of a remote data facility (RDF) group in which one or more LSUs (e.g., LUNs) on a data storage system are associated with a particular group under the control of a single RA which services the LSUs included therein. Rather than have a single R1 LSU and a single R2 LSU, a grouping may be defined so that a source group of LSUs, such as on data storage system 2102, have corresponding target LSUs of a target group, such as LSUs on data storage system 2104. Devices in a source group may be mirrored in corresponding LSUs of a target group using Dell EMC™ SRDF® functionality.

Techniques herein may be used with Dell EMC™ SRDF®, or more generally any RDF, operating in one or more different supported modes. For example, such modes may include Dell EMC™ SRDF® operating in synchronous mode, asynchronous mode, or adaptive copy mode. For example, in connection with Dell EMC™ SRDF®, the host may issue a write to an R1 LSU in a first data storage system and the data change is propagated to the R2 LSU in a second data storage system. As discussed in U.S. Pat. No. 5,544,347, Dell EMC™ SRDF® can be operated in either a synchronous mode or an asynchronous mode. When operating in the synchronous mode, the host does not consider a write I/O operation to be complete until the write I/O has been completed on both the first and second data storage systems. Thus, in synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system.

Depending on the physical distance between the data storage systems 2102, 2104, it may be desirable to operate in a mode such as asynchronous to avoid host timeouts while the host awaits acknowledgement regarding completion of a host I/O.

Described in following paragraphs are techniques that may be used in connection with performing data replication in a synchronous manner such as Dell EMC™ SRDF® operating in an synchronous mode (Dell EMC™ SRDF®/S). With synchronous mode data replication, a host 2110*a* may issue a write to the R1 LSU 2124. The primary or R1 data storage system 2102 may store the write data in its cache at a cache location and mark the cache location as including write pending (WP) data as mentioned elsewhere herein. The remote data replication facility operating in synchronous mode, such as Dell EMC™ SRDF®/S, may propagate the write data across an established RDF link (more generally referred to as a the remote replication link or link) such as over 2108*b*, 2122, and 2108*c*, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. Responsive to receiving this acknowledgement from the R2 data storage system 2104, the R1 data storage system 2102 may return an acknowledgement to the host 2110*a* that the write has been received and completed. Thus, generally, R1 LSU 2124 and R2 LSU 2126 may be logical devices, such as LUNs, configured as mirrors of one another. R1 and R2 LSUs may be, for example, fully provisioned LUNs, such as thick (i.e., not thin or virtually provisioned) LUNs, or may be LUNs that are thin or virtually provisioned logical devices.

When operating in asynchronous mode when processing a received write I/O operation from a host as noted above, the primary or R1 data storage system 2102 may store the write data in its cache at a cache location and mark the cache location as including write pending (WP) data as mentioned elsewhere herein. The write data may be propagated across an established RDF link (more generally referred to as a the remote replication link or link) such as over 2108*b*, 2122, and 2108*c*, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. With asynchronous mode, once the write data is stored in the cache of the local or R1 system 2102 and marked as WP, an acknowledgement regarding completion of the host write may be sent to the host 2110*a* by the system 2102. Thus, in asynchronous mode the system 2102 is not required to wait to receive the acknowledgement from the R2 data storage system 2104 prior to sending the acknowledgement to the host regarding completion of the write operation.

With reference to FIG. 6B, shown is a further simplified illustration of components that may be used in an embodiment in accordance with techniques herein. The example 2400 is simplified illustration of components as described in connection with FIG. 2. Element 2402 generally represents the replication link used in connection with sending write data from the primary R1 data storage system 2102 to the secondary R2 data storage system 2104. Link 2402, more generally, may also be used in connection with other information and communications exchanged between 2101 and 2104 for replication. As mentioned above, when operating in synchronous replication mode, host 2110*a* issues a write, or more generally, all I/Os including reads and writes, over a path to only the primary R1 data storage system 2102. The host 2110*a* does not issue I/Os directly to the R2 data storage system 2104. The configuration of FIG. 6B may also be referred to herein as an active-passive configuration such as may be used with synchronous replication and other supported replication modes where the host 2110*a* has an active connection or path 2108*a* over which all I/Os are issued to only the R1 data storage system. The host 2110*a* may have a passive connection or path 2404 to the R2 data storage system 2104. In the configuration of 2400, the R1 LSU 2124 and R2 LSU 2126 may be configured and identified as the same LSU, such as LSU A, to the host 2110*a*. Thus, the host 2110*a* may view 2108*a* and 2404 as two paths to the same LSU A where path 2108*a* is active (over which I/Os may be issued to LSU A) and where path 2404 is passive (over which no I/Os to the LSU A may be issued). Should the connection 2108*a* and/or the R1 data storage system 2102 experience a failure or disaster whereby access to R1 2124 configured as LSU A is unavailable, processing may be performed on the host 2110*a* to modify the state of path 2404 to active and commence issuing I/Os to the R2 LSU configured as LSU A. In this manner, the R2 LSU 2126 configured as LSU A may be used as a backup accessible to the host 2110*a* for servicing I/Os upon failure of the R1 LSU 2124 configured as LSU A.

It should be noted although only a single RDF link 2402 is illustrated, more generally any number of RDF links may be used in connection with replicating data from systems 2102 to system 2104 in connection with techniques herein.

Figure 6C:
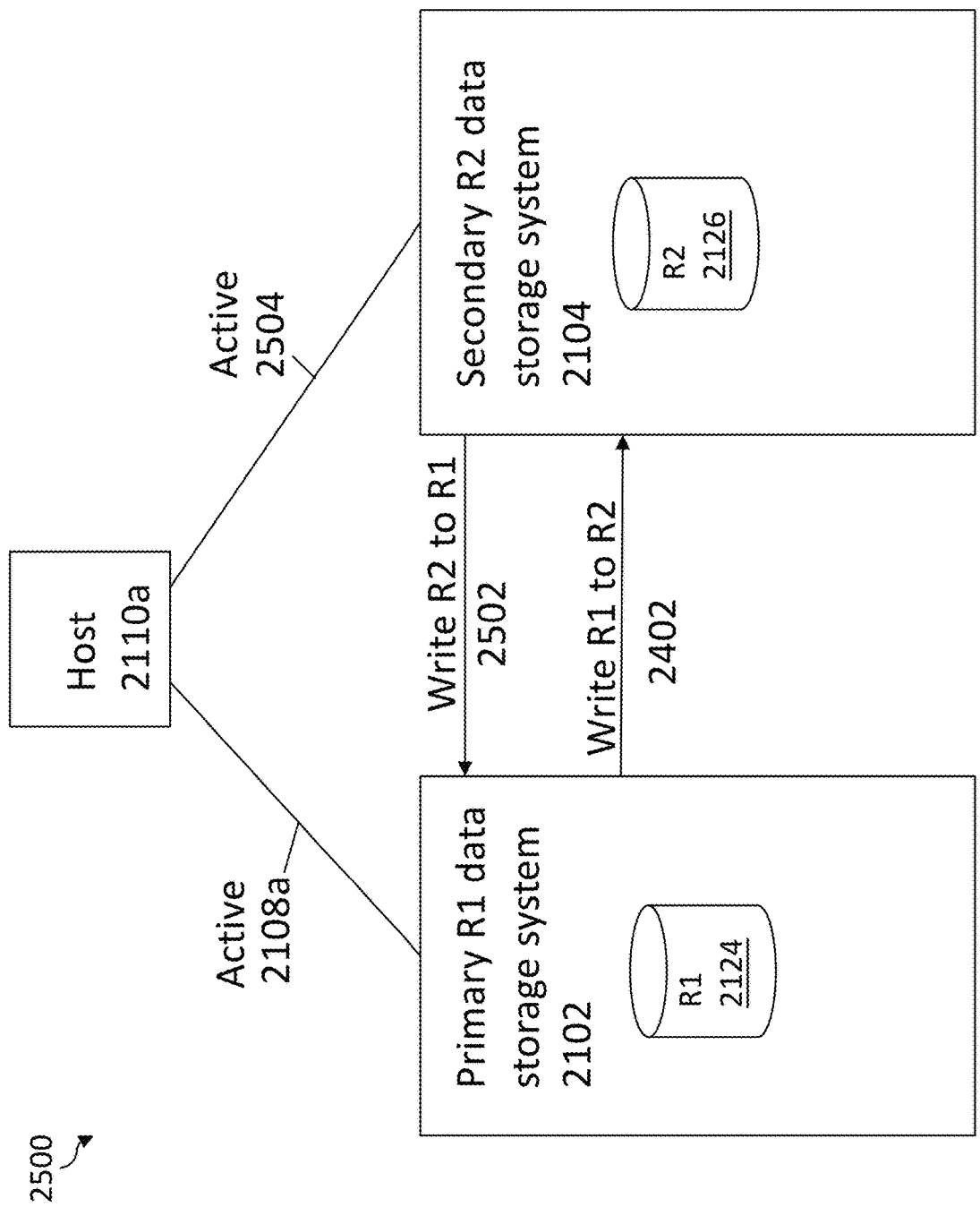

Referring to FIG. 6C, shown is another example configuration of components that may be used in an embodiment in accordance with techniques herein. The example 2500 illustrates an active-active configuration as may be used in connection with synchronous replication in at least one embodiment in accordance with techniques herein. In an active-active configuration with synchronous replication, the host 2110a may have a first active path 2108a to the R1 data storage system and R1 LSU 2124 configured as LSU A. Additionally, the host 2110a may have a second active path 2504 to the R2 data storage system and R2 LSU 2126 configured as LSU A. From the view of the host 2110a, paths 2108a and 2504 appear as 2 paths to the same LSU A as described in connection with FIG. 6B with the difference that the host in the example 2500 configuration may issue I/Os, both reads and/or writes, over both of paths 2108a and 2504. The host 2110a may send a first write over path 2108a which is received by the R1 system 2102 and written to cache of the R1 system 2102 where, at a later point in time, the first write is de-staged from the cache of the R1 system 2102 to physical storage provisioned for the R1 LSU 2124 configured as LSU A. The R1 system 2102 also sends the first write to the R2 system 2104 over link 2402 where the first write is written to cache of the R2 system 2104, where, at a later point in time, the first write is de-staged from the cache of the R2 system 2104 to physical storage provisioned for the R2 LSU 2126 configured as LSU A. Once the first write is written to the cache of the R2 system 2104, the R2 system 2104 sends an acknowledgement over link 2402 to the R1 system 2102 that it has completed the first write. The R1 system 2102 receives the acknowledgement from the R2 system 2104 and then returns an acknowledgement to host 2110a over path 2108a that the first write has completed.

The host 2110a may also send a second write over path 2504 which is received by the R2 system 2104 and written to cache of the R2 system 2104 where, at a later point in time, the second write is de-staged from the cache of the R2 system 2104 to physical storage provisioned for the R2 LSU 2126 configured as LSU A. The R2 system 2104 also sends the second write to the R1 system 2102 over a second link 2502 where the second write is written to cache of the R1 system 2102, and where, at a later point in time, the second write is de-staged from the cache of the R1 system 2102 to physical storage provisioned for the R1 LSU 2124 configured as LSU A. Once the second write is written to the cache of the R1 system 2102, the R1 system 2102 sends an acknowledgement over link 2502 to the R2 system 2104 that it has completed the second write. Once the R2 system 2104 receives the acknowledgement from the R1 system (regarding completion of the second write), the R2 system 2104 then returns an acknowledgement to host 2110a over path 2504 that the second write has completed.

Thus, in the example 2500, the illustrated active-active configuration includes a first RDF R1-R2 LSU pairing configured for synchronous replication (from 2102 to 2104) where the R1 LSU is 2124 and the R2 LSU is 2126 whereby writes to LSU A sent over 2108a to system 2102 are stored on the R1 LSU 2124 and also transmitted to system 2104 over 2402. The write sent over 2402 to system 2104 is stored on the R2 LSU 2126. Such replication is performed synchronously in that the acknowledgement to the host write sent over 2108a is not acknowledged as successfully completed unless and until the write data has been stored in caches of systems 2102 and 2104.

In a similar manner, the illustrated active-active configuration of the example 2500 includes a second RDF R1-R2 LSU pairing configured for synchronous replication (from 2104 to 2102) where the R1 LSU is 2126 and the R2 LSU is 2124 whereby writes to LSU A sent over 2504 to system 2104 are stored on the LSU 2126 (now acting as the R1 LSU of the second RDF LSU pairing) and also transmitted to system 2102 over connection 2502. The write sent over 2502 is stored on the R2 LSU 2124. Such replication is performed synchronously in that the acknowledgement to the host write sent over 2504 is not acknowledged as successfully completed unless and until the write data has been stored in caches of systems 2102 and 2104.

Effectively, using the second RDF LSU pairing in the active-active configuration with synchronous replication as in FIG. 6C has the R2 system 2104 act as another primary data storage system which facilitates propagation of writes received at the data storage system 2104 to the data storage system 2102. It should be noted that although FIG. 6C illustrates for simplicity a single host accessing both the R1 LSU 2124 and R2 LSU 2126, any number of hosts may access one or both of the R1 LSU 2124 and the R2 LSU 2126.

Although only a single RDF link 2402 is illustrated in connection with replicating data from systems 2102 to system 2104 in connection with techniques herein, more generally any number of RDF links may be used. Although only a single RDF link 2502 is illustrated in connection with replicating data from systems 2104 to system 2102, more generally any number of RDF links may be used. Furthermore, although 2 RDF links 2402 and 2502 are illustrated, in at least one embodiment, a single RDF link may be used in connection with sending data from system 2102 to 2104, and also from 2104 to 2102.

In at least one embodiment in accordance with techniques herein, the FC protocol may be used in connection with communications (e.g., over the SAN including the RDF links) between the data storage system 2102 and 2104.

Asynchronous remote replication (ARR) may include a plurality of replication cycles for an LSU (R1) in a source (e.g.,) storage system (S1), each cycle corresponding to a period of time and specifying any R1 tracks for which data was updated (e.g., by a write operation) during the period of time represented by the cycle. Each cycle may transition through four phases—two phases on S1 and two phases on a target (e.g., secondary) storage system S2. The two phases on S1 may include a capture phase during which the data updates for R1 are captured or collected, after which the cycle transitions into a transfer phase during which the updated data for R1 is transmitted from S1 to S2 to be updated for a target LSU (R2) on S2. On S2, the cycle begins in a receive phase during which the data updates transmitted as part of the transfer phase on S1 are received on S2, and transitions to an apply phase during which the data updates are applied to R2. Replication cycles for remote replication are described in greater detail in U.S. Pat. No. 9,880,946, "Data Transfer Techniques with Data Replication," to Benjamin Yoder et al., issued Jan. 30, 2018, the entire content of which is hereby incorporated by reference in its entirety.

Figure 7:
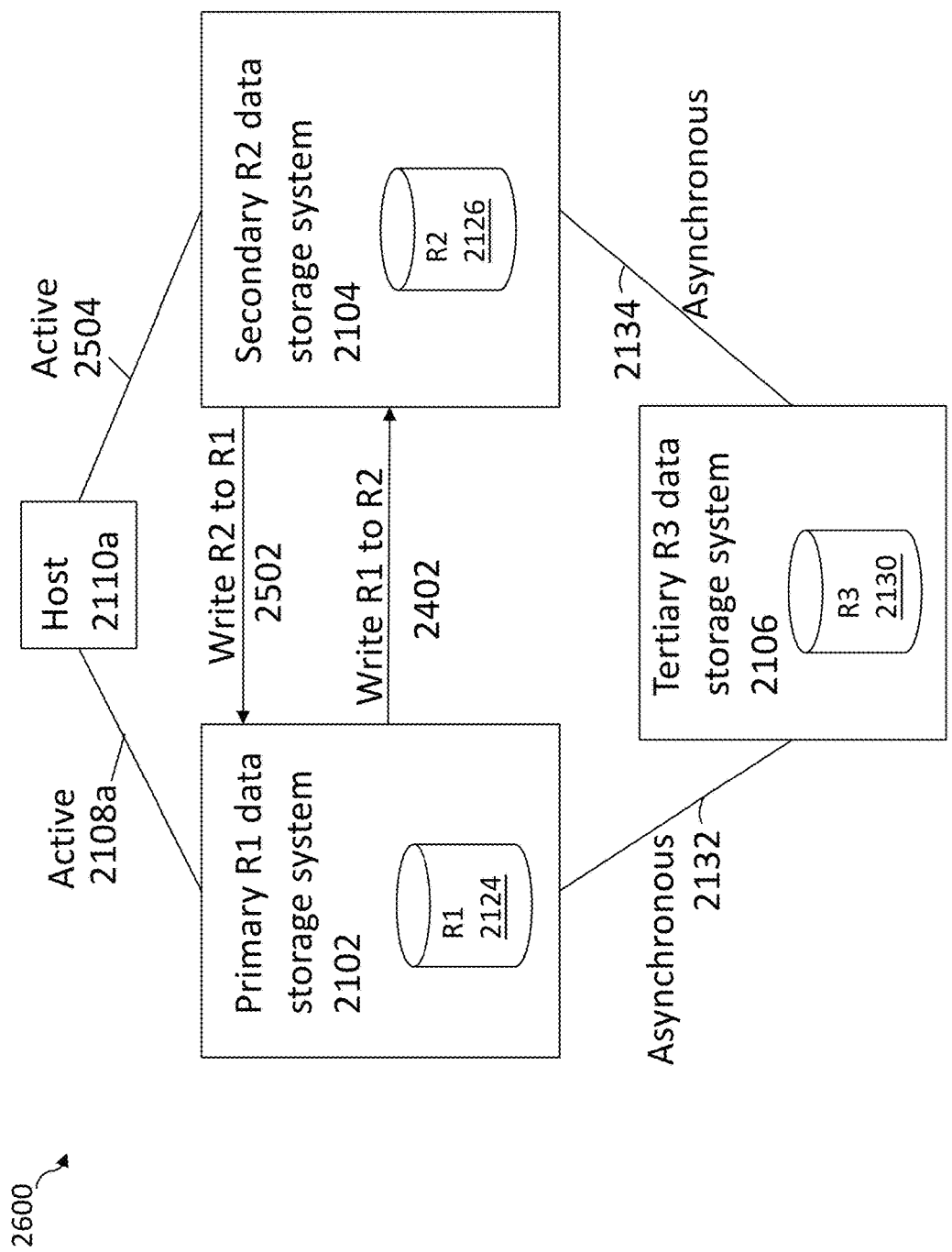
FIG. 7 is a block diagram illustrating an example of three storage systems configured for replication, according to embodiments of the invention.

FIG. 7 is a block diagram illustrating an example of a system 2600 including three storage systems configured for replication, according to embodiments of the invention. The system 2600 may be a variation of the system 2500 described in relation to FIG. 6C, and may have many of the same components providing the same functionality as described for the system 2500, where such components are labeled with the same reference numerals in FIG. 7 as in FIG. 6C. In addition, FIG. 7 may include a storage system 2106 including a target LSU (R3) 2130. The storage system 2106 may be considered a tertiary storage system.

The storage systems 2102 and 2104 may be connected to the storage system 2106 by links 2132 and 2134, respectively, which may be used to asynchronously replicate write data for shared LSUs R1 2124 and R2 2126, respectively, from the storage systems 2102 and 2104, respectively, to the target LSU, R3 2130 on the storage 2106. More generally, the links 2132 and 2134 also may be used in connection with other information and communications exchanged between storage systems 2102, 2104, respectively, and the storage system 2106. In at least one embodiment in accordance with techniques herein, the FC protocol may be used in connection with communications over the links 2132 and 3134.

In some embodiments of the invention, the techniques and mechanisms described herein for asynchronously replicating a shared LSU to a target LSU on a target storage system, including a method 800 described in connection with FIG. 8, may be implemented on the system 2600 or a suitable variation thereof.

Figure 8:
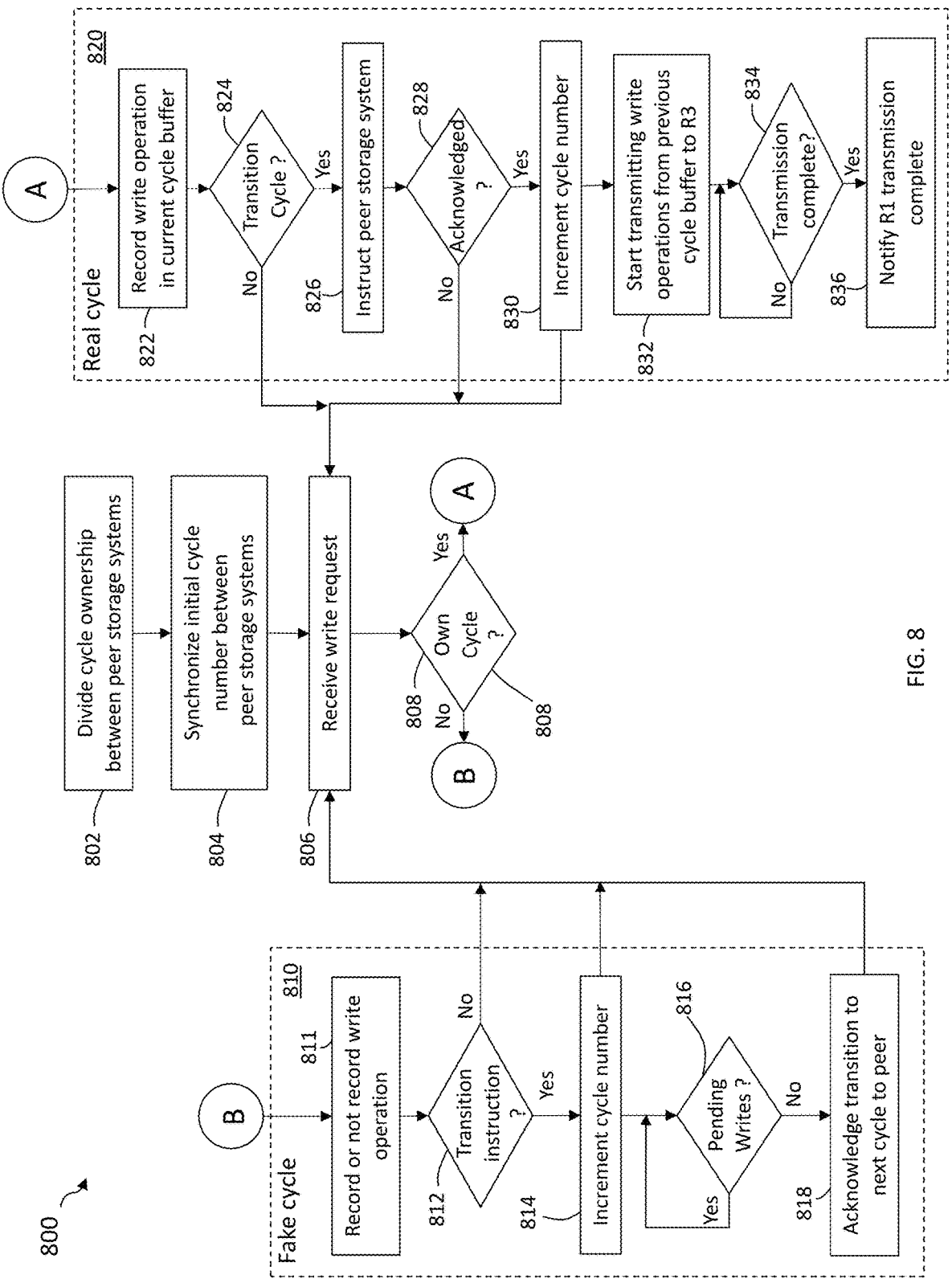
FIG. 8 is a flowchart of a method of performing asynchronous replication of a shared logical storage unit, according to embodiments of the invention.

FIG. 8 is a flowchart of the method 800 of performing asynchronous replication of a shared logical storage unit, according to embodiments of the invention. Other embodiments of a method of performing asynchronous replication of a shared logical storage unit, for example, variations of the method 800, are possible and are intended to fall within the scope of the invention.

In a step 802, cycle ownership may be divided between peer storage systems S1 and S2. For example, for a sequence of cycle numbers (0, 1, 2, 3 . . . ), S1 may be designated as the owner of a first series of alternating replication cycle numbers of the sequence (e.g., even numbers 0, 2, 4 . . . ) and S2 may be designated as the owner of a second alternating sequence replication cycle numbers of the sequence (e.g., odd numbers 1, 3, 5 . . . ). Each of S1 and S2 may maintain a data structure that specifies the cycles owned by each of S1 and S2.

In a step 804, an initial cycle number may be synchronized between S1 and S2. For example, after designating ownership of cycle numbers, and before activating ARR between S1, S2 and S3, S1 and S2 may exchange communications to synchronize to an initial cycle (e.g., Cycle 0) so that S1 and S2 may be synchronized for at least the beginning of the initial cycle—i.e., Cycle 0 on both S1 and S2 may begin with a same write operation. Such synchronization may include S1 and S2 setting a respective current cycle number parameter on S1 and S2, respectively, to the initial cycle number.

In a step 806, a write request may be received on a first of the two peer storage systems, S1, and in a step 808 it may be determined (e.g., by S1) whether S1 owns the current cycle, N, e.g., by accessing the data structure that specifies the cycles owned by each of S1 and S2.

If it is determined that S1 owns the current cycle (e.g., if the current cycle=N), then S1 may treat cycle N as a real cycle in a series of steps 820, whereas, if it is determined that S1 does not own the current cycle (e.g., the current cycle=N+1), S1 may treat the current cycle as a fake cycle in a series of steps 810.

Figure 9:
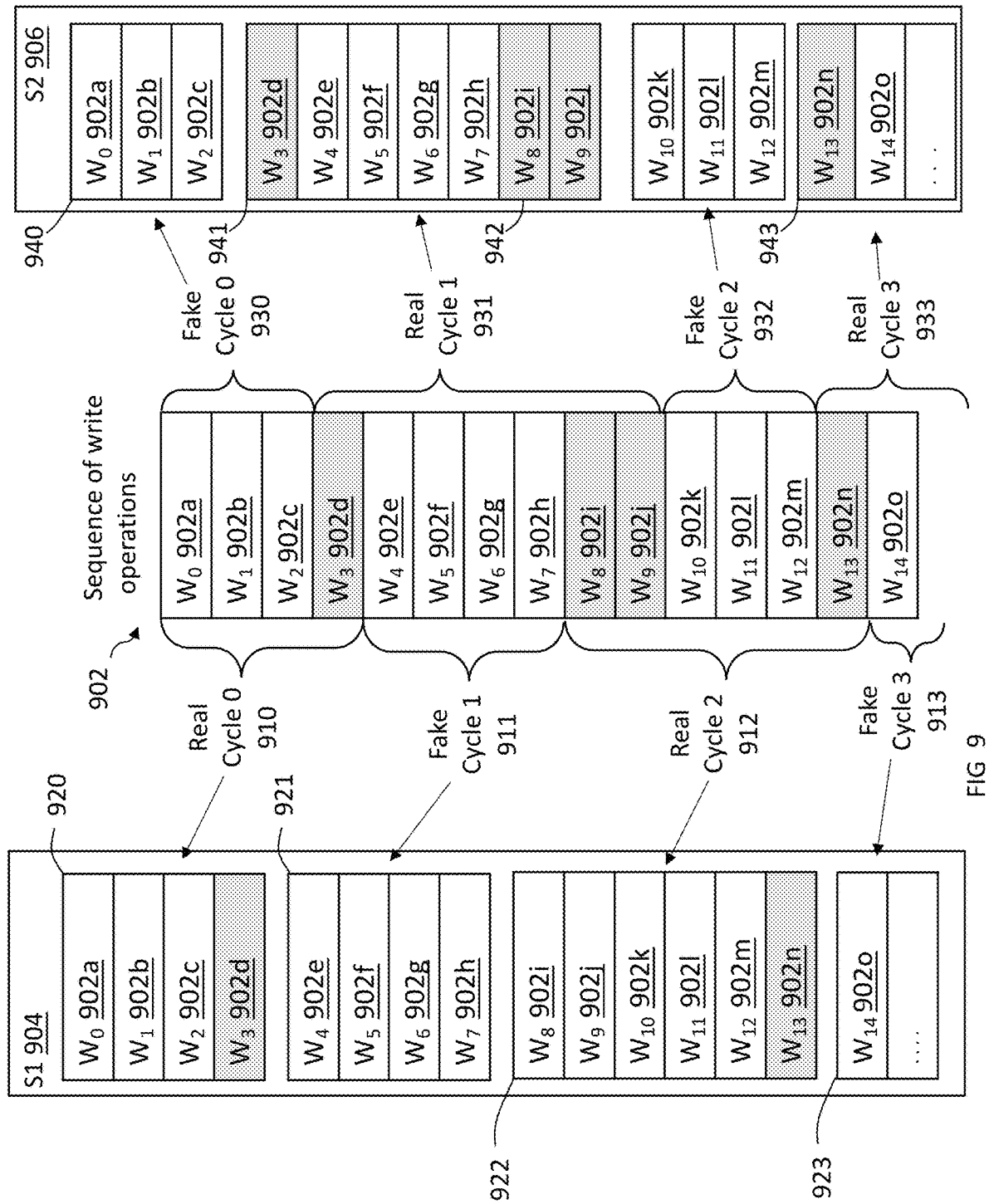
FIG. 9 is a flowchart illustrating overlapping replication cycles resulting from asynchronous replication for a shared logical storage unit, according to embodiments of the invention.

If S1 owns the current cycle (e.g., if the current cycle=N), such that it is treating the cycle as a real cycle, then, in a step 822, the write operation may be recorded in a current cycle buffer on S1 (e.g., one of buffers 920, 921 or 922 described in relation to FIG. 9), for example, as part of the capture phase of Cycle N. Concurrently on S2, when S2 receives a write operation (e.g., the same first write operation, for example, from S1 as part of synchronous replication), S2 may determine that it does not own the current cycle number, N, and, in response to this determination, S2 may treat Cycle N as a fake cycle.

In a step 824, it may be determined (e.g., by S1) whether it is time to transition to a next cycle, N+1. For example, each cycle, including Cycle N, may correspond to a predefined period of time, and it may be determined by S1 that that period of time for Cycle N has elapsed or will elapse soon, which triggers S1 to send the transition instruction to S2.

If it determined in the step 824 that it is not time to transition to a next cycle, then the method 800 may proceed to the step 806 where S1 may receive a next write operation that it associates with Cycle N and treats (i.e., processes) as a real cycle. If it is determined in the step 824 that it is time to transition to a next cycle, then S1 may send an instruction to transfer to N+1 to S2 in a step 826.

In a step 828, it may be determined whether an acknowledgement to the transition instruction has been received from S2. If an acknowledgement to the transition instruction has not been received, then the method 800 may proceed to the step 806 where it may receive a next write operation. It should be appreciated that, while the step 828 is illustrated as being performed in series with steps 826 and 830, the invention is not so limited. After the transition instruction is sent to S2 in the step 826, S1 may continue to receive write operations, associate them with Cycle N, and record them in a Cycle N buffer until an acknowledgement is received.

If it is determined in a step 828 that an acknowledgement to the transition instruction has been received from S2, then the cycle number on S1 may be incremented in a step 830. For example, a value of a cycle number parameter on S1 may be incremented from N to N+1. After incrementing the cycle number, the method 800 may receive a next write operation on S1 in the step 806, in which case performance of the next step 808 will result in a determination that for the current cycle, N+1, S1 is not the cycle owner, and the series of steps 810 for a fake cycle will be performed.

It should be appreciated that, during the transition period between S1 sending the transition instruction to S2 in the step 826 and receiving the acknowledgement from S2 in the step 828, S1 may have continued to record write operations as part of Cycle N—e.g., S1 remains in the capture phase for Cycle N. That is, write operations received on S1 during the transition period may be associated with Cycle N on S1 and recorded in a Cycle N buffer on S1, whereas write operations received on S2 during the transition period, after S2 increments it's cycle number in response to receiving the instruction from S1, may be associated with Cycle N+1 on S2 and recorded in a Cycle N+1 buffer on S2. Thus, the end of Cycle N on S1 may overlap with the beginning of Cycle N+1 on S2, and a same write operation may be associated with Cycle N on S1 and cycle N+1 on S2.

After incrementing the cycle number in the step 830, concurrently to returning to the step 806 to receive a next write request, S1 may start transmitting write operations from the previous cycle buffer (e.g., Cycle N buffer, which was the current cycle buffer before the cycle number was incremented in the step 830) to S3 in a step 832. For example, the Cycle N may enter the transfer phase of ARR.

In a step 834, it may be determined whether the transmission of the previous cycle to S3 is complete, for example, whether S3 has sent an acknowledgement to S2 that all of the writes of the previous cycle have been committed (e.g., staged to cache) on S3. When it is determined in the step 834 that the transmission of the previous cycle, cycle N, to S3 is complete, then S1 may notify (e.g., send a communication to) S2 that the transmission is complete, in response to which S2 can discard any write operations it may have recorded in a cycle buffer for Cycle N as a fake cycle on S2.

If it is determined in the step 808 that S1 does not own the current cycle (e.g., the current cycle=N+1) such that it is treating the cycle as a fake cycle, the method 800 may proceed to a step 811 of the series of fake cycle steps 810. In the step 811, the write operation received in the step 806 may either not be recorded or recorded in a current cycle (N+1) buffer on S1 depending on how S1 is configured for fake cycles.

In a step 812, it may be determined whether a transition instruction has been received from S2. If a transition instruction has not been received, then the method 800 may return to the step 806 to receive a next write operation for Cycle N+1.

If it is determined in the step 812 that a transition instruction has been received, then a cycle number may be incremented on S1 in a step 816, for example, from N+1 to N+2. For example, a cycle number parameter on S1 may be incremented to N+2. After incrementing the cycle number, the method 800 may receive a next write operation on S1 in the step 806, in which case performance of the next step 808 will result in a determination that S1 is the owner of the current cycle, N+2, and the series of steps 820 for a real cycle may be performed.

After the cycle number is incremented in the step 814, and concurrently to write operations for Cycle N+2 being processed in steps 806, 808 and 820, it may be determined whether there are any pending write operations on S1 for a previous cycle, N+1, as described in more detail elsewhere herein. The step 816 may be repeated (or the method 800 may simply wait) until there are no longer any pending writes for the previous cycle N+1 on S1, e.g., until it is determined in the step 814 that there are no pending writes. In response to determining that there are no longer any pending writes for the previous cycle N+1 on S1, S1 may acknowledge the transition to the next cycle N+2 to S2 in a step 818, and then method 800 may return to the step 806.

As described in more detail elsewhere herein, including in relation to the method 800, write operations received on (and synchronously replicated between) S1 and S2 during a transition period between cycles per techniques described herein may be associated with different cycles on S1 and S2, including being stored in cycle buffers for different cycles on each storage system, such that the different real cycles overlap, and a same write operation may be associated with different cycles on S1 and S2, e.g., near the end of one cycle on S1 and near the beginning of a next cycle on S2 or vice versa.

FIG. 9 is a flowchart illustrating overlapping replication cycles resulting from asynchronous replication for a shared logical storage unit, according to embodiments of the invention, for example, in accordance with the method 800.

A sequence 902 of write operations 902a-o may be received from a host system (not shown) for an LSU shared between storage systems S1 and S2. S1 and S2 may be configured in an active-active configuration to perform synchronous replication on the shared LSU and to asynchronously replicate the shared LSU to a target storage system (not shown). S1 and S2 each may be configured to perform the method 800. In the embodiment illustrated in FIG. 9, S1 owns cycle numbers 0 and 2, and S2 owns cycle numbers 1 and 3 such that Cycle 0 910, Cycle 1 931, Cycle 2 912 and Cycle 3 933 are real cycles, and Cycle 0 930, Cycle 1 911, Cycle 2 932 and Cycle 3 913 are fake buffers. In the embodiment illustrated in FIG. 9, both S1 and S2 are configured to record write operations in buffers for fake cycles.

As a result of performing the method 800 on the sequence of write operations 902, S1 may: associate write operations 902a-d with real Cycle 0 910 on S1 and record (e.g., temporarily store) them in cycle buffer 920; associate write operations 902e-h with fake Cycle 1 911 on S1 and record them in cycle buffer 921; associate write operations 902i-n with real Cycle 2 912 on S1 and record them in cycle buffer 921; and associate write operation 902o (and perhaps future write operations of the sequence) with fake Cycle 3 913 on S1 and record them in cycle buffer 931.

As a result of performing the method 800 on the sequence of write operations 902, S2 may: associate write operations 902a-c with fake Cycle 0 930 on S2 and record them in cycle buffer 940; associate write operations 902d-j with real Cycle 1 931 on S2 and record them in cycle buffer 941; associate write operations 902k-m with fake Cycle 2 932 on S2 and record them in cycle buffer 942; and associate write operations 902n-o (and perhaps future write operations of the sequence) with real Cycle 3 933 on S2 and record them in Cycle buffer 943.

As is visually illustrated in FIG. 9, the end of real Cycle 0 910 on S1 overlaps with the beginning of real Cycle 1 931 on S2, the end of real Cycle 1 931 on S1 overlaps with the beginning of real Cycle 2 932 on S2, and the end of real Cycle 2 912 on S1 overlaps with the beginning of real Cycle 3 933 on S2, and none of the fake cycles on S1 or S2 overlap. The write operations that are associated with different real cycles on S1 and S2 are shaded in gray and include: write operation 902d, which is associated with real Cycle 0 910 on S1 and real Cycle 1 931 on S2; write operations 902i and 902j, which are associated with real Cycle 1 931 on S2 and real Cycle 2 912 on S1; and write operation 902n, which is associated with real Cycle 2 912 on S1 and real Cycle 3 933 on S2.

Each of S1 and S2 may transmit the write operations from the cycle buffers of real cycles (i.e., that it owns) to S3 in any order as part of ARR, and communicate to S3 each time a transmission of a real cycle to S3 is complete. Further, S1 and S2 may be transferring different real cycles concurrently to S3. S3 may be configured to enforce Conditions A and B to ensure consistency, regardless of the order in which cycles and write operations thereof are received.

The overlapping of real cycles should not impact the write consistency of the ARR, as redundant write operations should overwrite the same data for R3 on S3. For example, the same write operation 902d is captured as part of real Cycle 0 910 (e.g., near the end of Cycle 0) on S1 and captured as part of real Cycle 1 931 (e.g., near the beginning of Cycle 1) on S2. The write operation 902d operation should first be applied to R3 for Cycle 0 910 per Condition B, and then the same write operation 902d should be applied to R3 for Cycle 1 931.

In the event of a failure of S1 or S2, the manner of recovery may depend on how the surviving peer storage system treats fake cycles, as describe in more detail elsewhere herein.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including method 800, or parts thereof, may be implemented using one or more of the systems and/or data structures described in relation to FIGS. 1A-7D and 9, or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, or any suitable combination thereof.

Software implementations of embodiments of the invention may include executable code that is stored on one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicate a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a system including a first storage system, a second storage system, a third storage system and logical storage unit synchronously replicated between the first storage system and the second system, wherein the logical storage unit is asynchronously replicated from the first storage system to the third storage system and asynchronously replicated from the second storage system to the third storage system, a method comprising:
   for a sequence of replication cycle numbers, designating a first series of alternating replication cycle numbers of the sequence to the first storage system and designating a second series of alternating replication cycle numbers of the sequence to the second storage system;
   in response to receiving a first write operation on the first storage system, determining whether a current cycle number on the first storage system is a cycle number included in the first series designated to the first storage system; and
   if the current cycle number on the first storage system is a cycle number included in the first series, recording the first write operation in a first cycle buffer on the first storage system.

2. The method of claim 1, further comprising:
prior to receiving the first write operation, synchronizing the first storage system and the second storage system to an initial cycle number.

3. The method of claim 1, further comprising:
the first storage system determining to transition from a first cycle to a second cycle; and
the first system transmitting an instruction to the second storage system to transition from the first cycle to the second cycle.

4. The method claim 3, further comprising:
the first system receiving an acknowledgement from the second system that the second system has transitioned to the second cycle; and
in response to receiving the acknowledgement, transitioning the first cycle on the first storage system from a capture phase to a transfer phase during which the write operations are transmitted from the first cycle buffer to the third storage system.

5. The method of claim 3, further comprising:
the second storage system receiving the instruction from the first storage system;
the second system storage incrementing a current cycle number on the second storage system to a next cycle number;
the second system storage acknowledging to a host system completion of any write operations being executed on the second system for the second cycle number; and
after the second system has acknowledged to the host system, the second storage system sending an acknowledgement to the instruction to the first system indicating that that second storage system has transitioned from the current cycle to a next cycle.

6. The method of claim 5, further comprising:
prior to the first storage system receiving the acknowledgement, the first system receiving a second write request;
the second storage system, in response to receiving the second write request, recording the second write operation in a second cycle buffer on the first storage system; and
the second storage system, at a later point in time, transmitting the second write operation from the second cycle buffer to the third storage system.

7. The method of claim 1, further comprising:
if the current cycle number on the first storage system is not a cycle number included in the first series, recording or not recording the first write operation in the first cycle buffer on the first storage system,
wherein the first storage system does not transmit the first write operation from the first cycle buffer to the third storage system, except if the first write operation is recorded in the first cycle buffer and the second storage system fails to transmit the first write operation to the third storage system.

8. The method of claim 1, wherein the first storage system and the second storage system are in an active-active configuration.

9. A system comprising:
a first storage system;
a second storage system;
a third storage system;

a logical storage unit synchronously replicated between the first storage system and the second system, wherein the logical storage unit is asynchronously replicated from the first storage system to the third storage system and asynchronously replicated from the second storage system to the third storage system; and executable logic that implements a method including:
for a sequence of replication cycle numbers, designating a first series of alternating replication cycle numbers of the sequence to the first storage system and designating a second series of alternating replication cycle numbers of the sequence to the second storage system;

in response to receiving a first write operation on the first storage system, determining whether a current cycle number on the first storage system is a cycle number included in the first series designated to the first storage system; and if the current cycle number on the first storage system is a cycle number included in the first series, recording the first write operation in a first cycle buffer on the first storage system.

10. The system of claim 9, wherein the method further includes:
prior to receiving the first write operation, synchronizing the first storage system and the second storage system to an initial cycle number.

11. The system of claim 9, wherein the method further includes:
the first storage system determining to transition from a first cycle to a second cycle; and
the first system transmitting an instruction to the second storage system to transition from the first cycle to the second cycle.

12. The system claim 11, wherein the method further includes:
the first system receiving an acknowledgement from the second system that the second system has transitioned to the second cycle; and
in response to receiving the acknowledgement, transitioning the first cycle on the first storage system from a capture phase to a transfer phase during which the write operations are transmitted from the first cycle buffer to the third storage system.

13. The system of claim 11, wherein the method further includes:
the second storage system receiving the instruction from the first storage system;
the second system storage incrementing a current cycle number on the second storage system to a next cycle number;
the second system storage acknowledging to a host system completion of any write operations being executed on the second system for the second cycle number; and
after the second system has acknowledged to the host system, the second storage system sending an acknowledgement to the instruction to the first system indicating that that second storage system has transitioned from the current cycle to a next cycle.

14. The system of claim 13, wherein the method further includes:
prior to the first storage system receiving the acknowledgement, the first system receiving a second write request;

the second storage system, in response to receiving the second write request, recording the second write operation in a second cycle buffer on the first storage system; and the second storage system, at a later point in time, transmitting the second write operation from the second cycle buffer to the third storage system.

15. The system of claim 9, wherein the method further includes:
if the current cycle number on the first storage system is not a cycle number included in the first series, recording or not recording the first write operation in the first cycle buffer on the first storage system,
wherein the first storage system does not transmit the first write operation from the first cycle buffer to the third storage system, except if the first write operation is recorded in the first cycle buffer and the second storage system fails to transmit the first write operation to the third storage system.

16. For a system including a first storage system, a second storage system, a third storage system and logical storage unit synchronously replicated between the first storage system and the second system, wherein the logical storage unit is asynchronously replicated from the first storage system to the third storage system and asynchronously replicated from the second storage system to the third storage system, computer-readable media having software stored thereon, the software comprising:

executable code that for a sequence of replication cycle numbers, designates a first series of alternating replication cycle numbers of the sequence to the first storage system and designates a second series of alternating replication cycle numbers of the sequence to the second storage system;

executable code that, in response to receiving a first write operation on the first storage system, determines whether a current cycle number on the first storage system is a cycle number included in the first series designated to the first storage system; and executable code that, if the current cycle number on the first storage system is a cycle number included in the first series, records the first write operation in a first cycle buffer on the first storage system.

17. The computer-readable media of claim 16, further comprising:
executable code that, prior to receiving the first write operation, synchronizes the first storage system and the second storage system to an initial cycle number.

18. The computer-readable media of claim 16, wherein the software further comprises:
executable code that controls the first storage system to determine to transition from a first cycle to a second cycle; and
executable code that controls the first system to transmit an instruction to the second storage system to transition from the first cycle to the second cycle.

19. The computer-readable media claim 18, wherein the software further comprises:
executable code that controls the first system to receive an acknowledgement from the second system that the second system has transitioned to the second cycle; and
executable code that, in response to receiving the acknowledgement, transitions the first cycle on the first storage system from a capture phase to a transfer phase during which the write operations are transmitted from the first cycle buffer to the third storage system.

20. The computer-readable media of claim 18, wherein the software further comprises:
- executable code that controls the second storage system to receive the instruction from the first storage system;
- executable code that controls the second system storage to increment a current cycle number on the second storage system to a next cycle number;
- executable code that controls the second system storage to acknowledge to a host system completion of any write operations being executed on the second system for the second cycle number; and
- executable code that controls the second storage system to send, after the second system has acknowledged to the host system, an acknowledgement to the instruction to the first system indicating that that second storage system has transitioned from the current cycle to a next cycle.

\* \* \* \* \*